United States Patent
Fujino et al.

(10) Patent No.: US 7,231,595 B1
(45) Date of Patent: Jun. 12, 2007

(54) ACQUIRING A FORM USING A PROXY APPLICANT AND DELEGATION DATA

(75) Inventors: Yoshito Fujino, Yokohama (JP); Teruji Nakamura, Sagamihara (JP); Keiko Takeuchi, Zama (JP); Ryohichi Yoshimura, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 09/669,598

(22) Filed: Sep. 26, 2000

(30) Foreign Application Priority Data

Oct. 18, 1999 (JP) ................................. 11-294993

(51) Int. Cl.
G06F 17/30 (2006.01)
(52) U.S. Cl. ................... 715/505; 715/507; 715/508
(58) Field of Classification Search ............... 715/505, 715/507–508; 713/201, 202, 65; 705/51
See application file for complete search history.

(56) References Cited

U.S. PATENT DOCUMENTS

| | | | | |
|---|---|---|---|---|
| 6,208,339 B1* | 3/2001 | Atlas et al. | ................. | 345/780 |
| 6,292,904 B1* | 9/2001 | Broomhall et al. | ............ | 714/1 |
| 6,345,278 B1* | 2/2002 | Hitchcock et al. | .......... | 707/100 |
| 6,421,693 B1* | 7/2002 | Nishiyama et al. | ......... | 715/507 |
| 6,499,042 B1* | 12/2002 | Markus | ...................... | 715/507 |
| 6,651,217 B1* | 11/2003 | Kennedy et al. | ............ | 715/507 |
| 6,684,369 B1* | 1/2004 | Bernardo et al. | ........... | 715/513 |
| 2002/0023108 A1* | 2/2002 | Daswani et al. | ............ | 707/507 |

OTHER PUBLICATIONS

Wobber et al, "Authentication in the TAOS Operating System", ACM Trans. on Comput. Sys., vol. 12, No. 1, Feb. 1994, pp. 3-32.*
Lampson et al, "Authentication in Distributed Systems: Theory and Practice", ACM Trans. on Comput. Sys., vol. 10, No. 4, Nov. 1992, pp. 265-310.*
Bertino, E., "A Flexible Authorization Mechanism for Relational Data Management Systems", ACM Trans. on Informat. Sys., vol. 17, No. 2, Apr. 1999, pp. 101-140.*
"Process-Driven Logon And Logoff As User-Driven", IBM TDB, vol. 33, No. 8, Jan. 1991.*
"Application and Workstation Access Control by User a Token Ring Local Area Network", IBM TDB, vol. 40, No. 7, Jul. 1997.*

(Continued)

Primary Examiner—C. B. Paula

(57) ABSTRACT

To provide a predetermined user with a privilege for a delegated application processing without providing the user with the application requester's log-in password. The application requester specifies a form class for identifying a form that requests a delegated application, both starting and ending dates for identifying a term of the requested delegated application together with a proxy applicant user ID that specifies a proxy applicant requested for the delegated application, then registers those items in the electronic form system. The electronic form system then registers those items in a proxy applicant definition table together with the application requester user ID). The proxy applicant can thus enter the form submission mode of the application requester. In the form submission mode of the application requester, forms that can be submitted by the proxy applicant are selected according to the information of the form class, the starting date, the ending date, etc. registered beforehand and displayed as a list.

22 Claims, 20 Drawing Sheets

OTHER PUBLICATIONS

"Using Paradox 5 For Windows" Special Edition, Que, 1994, pp. 133-139, and 526-529.*

Mitsuo et al, "Electronic Decision System," Patent Abstracts of Japan, Publication No. 06-231143, Application No. 05-034404 (Aug. 1994).

"Fujitsu IFOS-SV/UUser's Guide," 88-96 (Sep. 1993). This article relates to an electronic check approval system and discloses a screen for selecting a person from whom delegation is given.

"Fujitsu IFOS-SV/U V02 User's Guide," 23-26, 105-109 (Aug. 1995). This article relates to an electronic check approval system and discloses allowing a delegated person to approve all the checks of persons from whom delegation is given.

"Fuji Technical Report," vol. 71, No. 12, 673-676 (1998). This article describes ExchangeUSE workflow. The workflow has functions of approval, progress management, and delegation. This article also discloses allowing the description of a workflow route definition.

"Lotus Notes Magazine," vol. 20, 51-56 (1998). This article describes the I-NetJ workflow engine. It discloses a workflow template and a front-end database. The I-NetJ workflow database also includes a rolebase, conditional rolebase, organization database, and runtime definition.

"Lotus Solutions 99," Windows NT World, vols. 4 and 8, 268-269 (Aug. 1999). This article describes ISOlogy for Domino. The described features include approval by manager, fixed route, etc.

"Nikkei Open System," vol. 54, 340-345 (Sep. 1997). This article describes how to construct an intranet using Lotus Notes Domino. In particular, this article describes a manager approval route and fixed approval route.

Mitsuo et al, "Electronic Decision System," Patent Abstracts of Japan, Publication No. 06-231143, Application No. 05-034404 (Aug. 1994). This application is directed to an electronic decision system capable of deciding an application even if a decider is absent for a long period or a short period. A database 1 connected to a host computer stores application data 3, decision waiting data 5, and decision route data 7.

When an operator inputs an ID number and a password from terminal equipment, the computer checks the inputted contents (12), and if the password is valid, retrieves the existence of an application to the computer itself, the application applied to the computer as a substitute, or the application applied to the computer as approval after an allowable prescribed period by using the ID number as key (13). When the application concerned exists, the contents of the application are read out (14) and displayed on a display in the terminal equipment (15). In the case of submitting the application, the operator writes the decision history through a keyboard.

* cited by examiner

NEW PROXY APPLICANT SETTING

OPERATION SCREEN DISPLAY

FORM LIST DISPLAY

FORM DISPLAY

FIG. 14

| | USER PROFILE TABLE | |
|---|---|---|
| 210 | | |
| | ITEM | DESCRIPTION |
| 211 | USER ID | USER IDENTIFIER |
| 213 | NAME | USER NAME |
| 215 | COMMENT | USER'S ADDED DATA |
| 217 | PASSWORD | USER'S PASSWORD (ENCRYPTED) |
| 219 | SERVER ID | IDENTIFIER OF A SERVER FOR STORING FORMS |
| 221 | TABLE NAME | FORM STORING TABLE NAME |
| 223 | MAIL ADDRESS | USER'S MAIL ADDRESS |

FIG. 15

| | PROXY APPLICANT DEFINITION TABLE | |
|---|---|---|
| 230 | | |
| | ITEM | DESCRIPTION |
| 231 | RECORD ID | IDENTIFIER FOR DEFINING A PROXY APPLICANT |
| 233 | REQUESTER ID | USER IDENTIFIER OF AN APPLICATION REQUESTER |
| 235 | PROXY APPLICANT ID | USER IDENTIFIER FOR ACTUAL APPLICATION/APPROVAL |
| 237 | APPLICATION PRIVILEGE | 1: ENABLE   0: DISABLE |
| 239 | APPROVAL PRIVILEGE | 1: ENABLE   0: DISABLE |
| 241 | DELEGATION STARTING DATE | STARTING DATE OF VALIDITY OF THIS DEFINITION |
| 243 | DELEGATION ENDING DATE | ENDING DATE OF VALIDITY OF THIS DEFINITION |
| 245 | FORM CLASS ID | NULL: FORM WITHOUT FORM CLASS '*': ALL FORMS |

FIG. 16

| | ORGANIZATION TABLE | |
|---|---|---|
| 250 | | |
| | ITEM | DESCRIPTION |
| 251 | ORGANIZATION ID | IDENTIFIER OF AN ORGANIZATION |
| 253 | ORGANIZATION NAME | NAME OF AN ORGANIZATION |
| 255 | COMMENT | ADDED DATA FOR AN ORGANIZATION |
| 257 | MANAGER | MANAGER OF AN ORGANIZATION |
| 259 | DIRECTLY BELONGING ORGANIZATION ID | IDENTIFIER OF A DIRECTLY BELONGING ORGANIZATION |

FIG. 17

| | ORGANIZATION MEMBER TABLE | |
|---|---|---|
| | ITEM | DESCRIPTION |
| 271 | ORGANIZATION ID | IDENTIFIER OF AN ORGANIZATION |
| 273 | MEMBER ID | USER ID OF AN ORGANIZATION MEMBER |

| | CATEGORY ACL TABLE | |
|---|---|---|
| | ITEM | DESCRIPTION |
| 291 | CATEGORY ID | IDENTIFIER OF A CATEGORY |
| 293 | USER ID/ ORGANIZATION ID | ACCESSIBLE USER/ORGANIZATION ID. '*': IDs OF ALL USERS |
| 295 | TYPE | 0: USER ID<br>1: ORGANIZATION ID (MEMBERS AND MANAGER OF AN ORGANIZATION)<br>2: ORGANIZATION ID (ALL MEMBERS OF LOWER ORGANIZATIONS AND ALL MANAGERS OF AN ORGANIZATION) |
| 297 | ACCESS PRIVILEGE | 1: REFERENCE ENABLED (GENERAL USER)<br>255: UPDATING ENABLED (MANAGER) |

| | FORM CLASS | |
|---|---|---|
| | ITEM | DESCRIPTION |
| 311 | FORM CLASS ID | IDENTIFIER OF A FORM CLASS |
| 313 | FORM CLASS NAME | NAME OF A FORM CLASS |
| 315 | COMMENT | ADDED DATA TO A FORM CLASS |

| | FORM ENTRY TABLE | |
|---|---|---|
| 330 | ITEM | DESCRIPTION |
| 331 | RECORD ID | IDENTIFIER OF A FORM ENTRY |
| 333 | SERVER ID | IDENTIFIER OF A SERVER |
| 335 | FORM ID | IDENTIFIER OF A FORM |
| 337 | CATEGORY ID | IDENTIFIER OF A BELONGING CATEGORY |
| 339 | CATEGORY NAME | NAME OF A BELONGING CATEGORY |
| 341 | SUB-CATEGORY NAME 1 | NAME OF A BELONGING SUB-CATEGORY |
| 343 | SUB-CATEGORY NAME 2 | NAME OF A BELONGING SUB-CATEGORY |
| 345 | SUB-CATEGORY NAME 3 | NAME OF A BELONGING SUB-CATEGORY |
| 347 | SUB-CATEGORY NAME 4 | NAME OF A BELONGING SUB-CATEGORY |

FIG. 21

| | FORM DEFINITION TABLE | |
|---|---|---|
| 350 | ITEM | DESCRIPTION |
| 351 | RECORD ID | IDENTIFIER OF FORM DEFINITION |
| 353 | SERVER ID | IDENTIFIER OF A SERVER |
| 355 | FORM ID | IDENTIFIER OF A FORM |
| 357 | TITLE | TITLE OF A FORM |
| 359 | COMMENT | ADDED DATA TO A FORM |
| 361 | FORM CLASS ID | IDENTIFIER OF A FORM CLASS |
| 363 | DELEGATED APPLICATION FLAG | 1: ENABLE    0: DISABLE |
| 365 | DELEGATION APPROVAL FLAG | 1: ENABLE    0: DISABLE |
| 367 | VALID TERM STARTING DATE | STARTING DATE OF A VALID TERM FOR A FORM |
| 369 | VALID TERM ENDING DATE | ENDING DATA OF A VALID TERM FOR A FORM |
| 371 | ROUTING DEFINITION | FORM ROUTING DEFINITION (XML) |
| 373 | FIELD DEFINITION | FORM FIELD DEFINITION (XML) |
| 375 | EVENT ACTION DEFINITION | FORM EVENT ACTION DEFINITION (XML) |
| 377 | START LAYOUT | FORM LAYOUT PATH FOR APPLICATION (JSP FILE) |
| 379 | START EVENT LIST | VALID EVENT LIST FOR APPLICATION |

Proxy applicant setting

Proxy applicant user ID: [_____] ～641

Privilege range: ○ Apply (643)   ⦿ Approve (645)   ○ All (647)

Form Class: ☐ All (649)

(Plural selections OK) [Not specified / Personnel affairs] ～651

ⓘ Plural objects can be selected while the shift or ctrl key is held down.

Valid term: ⓘ day/month/year (input example: 24/08/1999)

Started on: [1999/08/24] ～653

Ended on: [_____] ～655

ⓘ Set a day after today for the ending date.

[ New ] 657   [ Retry ] 659

ACQUIRING A FORM USING A PROXY APPLICANT AND DELEGATION DATA

FIELD OF THE INVENTION

The present invention relates to an electronic form processing system, and more particularly, to an electronic form system that enables a user to delegate the processing of predetermined electronic forms to a proxy applicant.

BACKGROUND OF THE INVENTION

When a proxy user submits a non-electronic form on behalf of another user, the proxy user fills necessary items in the form according to the request from the requester and files the form to a predetermined place. In the case of an electronic form system, however, the system has been confronted with problems in such "delegated applications." This is because a user ID and a password are usually indispensable to logging into the system in order to submit an electronic form.

Furthermore, in the case of groupware, such as Lotus Notes ("Lotus Notes" is a trademark of Lotus Inc.), such an electronic form system is linked to an electronic mail system or various types of database processing systems. If a proxy applicant is enabled to use both the user ID and password of a user, the proxy applicant can access systems other than the requested one, thereby causing security problems. Similar problems will also arise in the electronic form system itself, since the system handles various forms, such as reports on user's leave, bank account change reports for salary payment, office supplies acquisition reports and new employee registration reports, none of which can be accessed without access privileges. Letting others use both the user ID and password of a user always has a potential to cause such problems.

For example, if a user permits a proxy applicant to use his/her user ID and password so as to apply for acquisition of official supplies, the proxy applicant can also submit a form requesting acquisition of personnel data and change the registered personal data such as his/her home address and family structure. This is why it has been impossible to ask for delegated application in any of such conventional electronic form systems for the reasons of security.

A need therefore exists for a system that can provide a predetermined user with a privilege for a delegated application processing without providing the user with the application requester's log-in password. Yet another need exists for a system that enables an application requester to specify a form allowing a delegated application. Another need exists a system that enables the application requester to specify a term of allowing a delegated application. In addition, a need exists for a system that enables a proxy applicant who is requested for a delegated application to submit a form over his/her original privilege using the privilege of the application requester. Yet another needs exists for a system that enables a proxy applicant who is requested for a delegated application to enter the mode of the application requester and process a form without logging in the system again as a proxy applicant. Another needs exists for a system that enables both a proxy applicant who is requested for a delegated application and an application requester to receive processing end memos, error notices and rejected forms properly. Another need exists for a system that enables a form designer to design forms without distinguishing between proxy application forms and normal application forms. In addition, a need exists for a system that can reduce resources to be used and can be controlled by the user easily so as to understand things intuitively therein.

SUMMARY OF THE INVENTION

In order to achieve the objects of the invention, an application requester specifies a form class that identifies a form of requesting a delegated application and both starting and ending dates to identify a term of requesting the delegated application, together with a proxy applicant user ID that specifies a proxy applicant who is requested for the delegated application and registers those items in the electronic form system. The electronic form system then registers the applicant together with the application requester user ID in a proxy applicant definition table. The proxy applicant is thus enabled to enter the form submission mode of the application requester. In the form submission mode of the application requester, the available forms for the proxy applicant are selected according to the information of the registered form class, including starting and ending dates and displayed as a list. The proxy applicant then selects one of the available forms to acquire a blank form of the selected electronic form, so that the user information of the application requester such as the name, user ID and belonging organization are filled in the form automatically. The proxy applicant can thus apply for an electronic form instead of the application requester.

In one aspect of the present invention, an electronic form acquiring method is provided for an electronic form system that certifies a user, comprising the steps of:

(a) registering form condition data that identifies a form of requesting a delegated application and delegation term condition data that identifies a term of requesting the delegated application beforehand so as to be related to application requester specification data that specifies an application requester and proxy applicant specification data that specifies a proxy applicant who is requested for the delegated application respectively;

(b) receiving an input for notifying that the proxy applicant specifies the application requester specification data, thereby accessing a first electronic form;

(c) inspecting whether or not the current date adapts to the delegation term condition data registered so as to be related to the application requester specification data and the proxy applicant specification data;

(d) inspecting whether or not the first electronic form coincides with the form condition data registered so as to be related to the application requester specification data and the proxy applicant specification data; and (e) enabling the first electronic form to be acquired if results of the inspections performed in (c) and (d) are acceptable.

In the Claims included in the specification of this application, the "form condition data" is a concept that includes form ID for identifying a specific form uniquely and data for identifying such a predetermined form group as a form class, as well as data for identifying such a predetermined form as a conditional expression in which "XXX" is set as the first three digits and a number of 22 or under is set in the lower two digits of the form ID. The "delegation term condition data" is a concept including data specifying both start and end of a term, such as "delegation starting date," and "delegation ending date," as well as data for specifying a valid term of a delegated application, such as every Tuesday, a national holiday, a weekday 0:00–9:00 and 17:00–24:00, or a conditional expression.

The "application requester specification data" is a concept including data for specifying an application requester or group, such as a user ID, a user name, an address name, or an organization ID. The "proxy applicant specification data" is a concept including data for specifying a proxy applicant or group, such as a user ID, a user name, an address name, or an organization ID.

The "input for notifying an access to the first electronic form" means a concept including an input for notifying acquiring of a list of forms including the first electronic form as well as an input notifying a direct access to the first electronic form. The "enabling the first electronic form to be acquired" means a concept including processings for displaying the first electronic form on a display unit directly, displaying the information of links and paths that can access the first electronic form, providing an access privilege, or canceling security.

In another aspect of the present invention, an electronic form acquiring method is provided for an electronic form system that certifies a user. The method comprises the steps of:

(a) registering form condition data that identifies a form of requesting a delegated application beforehand so as to be related to application requester specification data that specifies an application requester and proxy applicant specification data that specifies a proxy applicant who is requested for the delegated application;

(b) receiving an input for notifying that the proxy applicant specifies the application requester specification data, thereby accessing a first electronic form;

(c) inspecting whether or not the first electronic form coincides with the form condition data registered so as to be related to the application requester specification data and the proxy applicant specification data; and (d) enabling the first electronic form to be acquired if a result of the inspection performed in (c) is acceptable.

In another embodiment of the present invention, an electronic form acquiring method is provided for an electronic form system that certifies a user. The method comprises the steps of:

(a) registering delegation term condition data that identifies a term of requesting a delegated application beforehand so as to be related to application requester specification data that specifies an application requester and proxy applicant specification data that specifies a proxy applicant who is requested for the delegated application;

(b) receiving an input for notifying that the proxy applicant specifies the application requester specification data, thereby accessing a first electronic form;

(c) inspecting whether or not the current date coincides with the delegation term condition data registered so as to be related to the application requester specification data and the proxy applicant specification data;

(d) enabling the first electronic form to be acquired if a result of the inspection performed in (c) is acceptable.

In another aspect of the invention, an electronic form acquiring method is provided that further includes a step of filling personal data of the application requester in the acquired first electronic form automatically.

In yet another aspect of the present invention, an electronic form acquiring method is provided that further includes a step of displaying a list of available electronic forms.

In another aspect of the invention, an electronic form acquiring method is provided that further includes a step of deciding the list of available electronic forms according to an organization to which the application requester belongs.

According to another aspect of the invention, an electronic form acquiring method is provided, wherein each of the electronic forms managed by the electronic form system is related to a delegated application flag indicating whether or not the delegated application is enabled and the electronic form is available when the delegated application flag indicates "enable."

Another aspect of the present invention provides an electronic form acquiring method, wherein an approver related to the electronic form receives a notice recognizable that the application has been submitted and the application requester receives a notice recognizable that the application has been submitted by the proxy applicant when predetermined items are filled in the acquired electronic form and an input for directing submission of the application is made.

In another aspect of the invention, an electronic form system is provided, including:

(a) a directory manager that certifies a user;

(b) a proxy applicant definition table that manages form condition data that identifies a form of requesting a delegated application and delegation term condition data that identifies a term of requesting a delegated application so as to be related to application requester specification data that specifies an application requester and proxy applicant specification data that specifies a proxy applicant who is requested for a delegated application;

(c) a blank form collector, which acquires data that can specify the first electronic form;

(c1) the blank form collector is activated in response to an input for notifying that the proxy applicant specifies the application requester specification data, thereby accessing a first electronic form;

(c2) inspecting whether or not the current date adapts to the delegation term condition data registered so as to be related to the application requester specification data and the proxy applicant specification data;

(c3) inspecting whether or not the first electronic form adapts to the form condition data registered so as to be related to the application requester specification data and the proxy applicant specification data; and (c4) results of the inspections of the delegation term condition data and the form condition data are acceptable.

According to another aspect of the invention, an electronic form system is provided which can certify a user, including:

(a) a directory manager that certifies a user;

(b) a proxy applicant definition table that manages form condition data that identifies a form of requesting a delegated application so as to be related to application requester specification data that specifies an application requester and proxy applicant specification data that specifies a proxy applicant who is requested for a delegated application;

(c) a blank form collector, which acquires data that can specify the first electronic form when;

(c1) the blank form collector is activated in response to an input for notifying that the proxy applicant specifies the application requester specification data, thereby accessing the first electronic form;

(c2) inspecting whether or not the first electronic form adapts to the form condition data registered so as to be related to the application requester specification data and the proxy applicant specification data; and (c3) a result of the inspection of the delegation term condition data is acceptable.

Another aspect of the present invention, provides an electronic form system, including:

(a) a directory manager that certifies a user;

(b) a proxy applicant definition table that manages delegation term condition data that identifies a term of requesting a delegated application so as to be related to application requester specification data that specifies an application requester and proxy applicant specification data that specifies a proxy applicant who is requested for the delegated application;

(c) a blank form collector, which acquires data that can specify the first electronic form when;

(c1) the blank form collector is activated in response to an input for notifying that the proxy applicant specifies the application requester specification data, thereby accessing the first electronic form;

(c2) inspecting whether or not the current date coincides with the delegation term condition data registered so as to be related to the application requester specification data and the proxy applicant specification data; and (c3) a result of the inspection for the form condition data is acceptable.

In another aspect of the invention, a storage medium is provided for storing a program that acquires an electronic form, said program being executed in the electronic form system for certifying a user. The program contains;

(a) a program code for accessing a memory in which form condition data that identifies a form of requesting a delegated application and delegation term condition data that identifies a term of requesting the delegated application are registered so as to be related to application requester specification data that specifies an application requester and proxy applicant specification data that specifies a proxy applicant who is requested for the delegated application;

(b) a program code for recognizing that an input for notifying that the proxy applicant specifies the application requester specification data, thereby accessing the first electronic form, is received;

(c) a program code for inspecting whether or not the current date adapts to the delegation term condition data registered so as to be related to the application requester specification data and the proxy applicant specification data;

(d) a program code for inspecting whether or not the first electronic form adapts to the form condition data registered so as to be related to the application requester specification data and the proxy applicant specification data; and (e) a program code for enabling the first electronic form to be acquired if results of the inspections performed for the delegation term condition data and the form condition data are acceptable.

Another aspect of the present invention provides a storage medium for storing a program that acquires an electronic form, the program being executed in the electronic form system for certifying a user. The program contains:

(a) a program code for accessing a memory in which form condition data that identifies a form of requesting a delegated application is registered so as to be related to application requester specification data that specifies an application requester and proxy applicant specification data that specifies a proxy applicant who is requested for the delegated application;

(b) a program code for recognizing that an input for notifying that the proxy applicant specifies the application requester specification data, thereby accessing the first electronic form, is received;

(c) a program code for inspecting whether or not the first electronic form coincides with the form condition data registered so as to be related to the application requester specification data and the proxy applicant specification data; and (d) a program code for enabling the first electronic form to be acquired if a result of the inspection performed for the form condition data is acceptable.

In yet another aspect of the present invention, a storage medium is provided for storing a program that acquires an electronic form, said program being executed in the electronic form system for certifying a user. The program contains:

(a) a program code for accessing a memory in which delegation term condition data that identifies a term of requesting a delegated application is registered so as to be related to application requester specification data that specifies an application requester and proxy applicant specification data that specifies a proxy applicant who is requested for the delegated application;

(b) a program code for recognizing that an input for notifying that the proxy applicant specifies the application requester specification data, thereby accessing the first electronic form, is received;

(c) a program code for inspecting whether or not the current date adapts to the delegation term condition data registered so as to be related to the application requester specification data and the proxy applicant specification data; and (d) a program code for enabling the first electronic form to be acquired if a result of the inspection performed for the delegation term condition data is acceptable.

According to another aspect of the present invention, a storage medium is provided that further includes;

a program code for filling personal data of the application requester in the acquired first electronic form automatically.

In a further aspect of the present invention, a storage medium is provided, which further includes;

a program code for displaying a list of available electronic forms.

A further aspect of the present invention provides a storage medium, wherein the list of available electronic forms is decided according to an organization to which the application requester belongs.

In yet another aspect of the invention, a storage medium is provided, wherein an electronic form managed by the electronic form system is related to a delegated application flag indicating whether or not the delegated application is enabled and an electronic form is available when the delegated application flag indicates "enable."

In a further aspect of the invention, a storage medium is provided, which further contains a program code for transmitting a notice to an approver related to the electronic form, the notice being recognizable that said electronic form has been submitted in response to an input for directing said application after predetermined items are filled in said acquired electronic form, and a program code for transmitting a notice to the application requester, the notice being recognizable that said application has been made by said proxy applicant.

BRIEF DESCRIPTION OF THE DRAWINGS

FIG. 14 illustrates the concept of a user profile table in the preferred embodiment of the present invention;

FIG. 15 illustrates the concept of a proxy applicant definition table in the preferred embodiment of the present invention;

FIG. 16 illustrates the concept of an organization table in the preferred embodiment of the present invention;

FIG. 17 illustrates the concept of an organization member table in the preferred embodiment of the present invention;

FIG. 18 illustrates the concept of a category ACL table in the preferred embodiment of the present invention;

FIG. 19 illustrates the concept of a form class table in the preferred embodiment of the present invention;

FIG. 20 illustrates the concept of a form entry table in the preferred embodiment of the present invention;

FIG. 21 illustrates the concept of a form definition table in the preferred embodiment of the present invention;

FIG. 22 illustrates the concept of a proxy applicant setting screen in the preferred embodiment of the present invention;

DETAILED DESCRIPTION OF PREFERRED EMBODIMENTS

Figure 1:
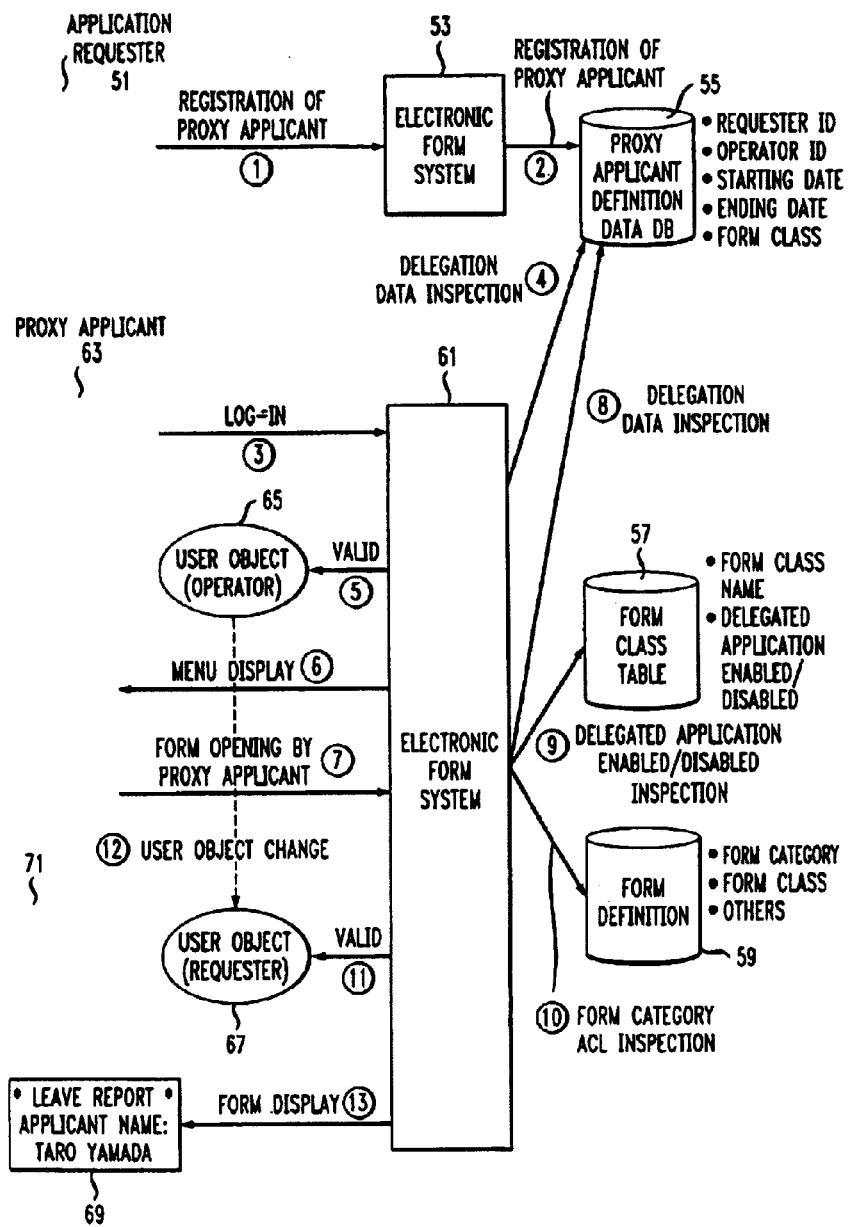
FIG. 1 shows the outline of an electronic form management system in a preferred embodiment of the present invention.

FIG. 1 shows the outline of an electronic form management system in a preferred embodiment of the present invention. In this embodiment, at first, an application requester 51 accesses an electronic form system 53 and specifies the user name, the term, and the form type for allowing and requesting a delegated application. The information of this delegated application is stored in a proxy applicant definition data storage 55. At this time, the application requester 51 can specify a form type and a term of allowing a delegated application, so that the requester 51 can select a range of the delegated application so as to prevent providing the proxy applicant with an excessive proxy privilege.

If this proxy applicant is registered, a dynamic delegation processing menu is displayed automatically on the operation screen of the user (proxy applicant 63) who is requested for the delegated application, according to the proxy applicant definition data 55. Selecting an item from the menu, the proxy applicant 63 can enter the application requester mode without doing any special operation such as a new long-in instead of the application requester 51.

Furthermore, at the time when the above menu item is selected, the electronic form system 61 begins inspecting of whether or not the delegated application is enabled for the user, as well as inspecting both category and type of the form so as to generate a list of available forms and displays the list on the screen of the proxy applicant. In this list, forms that cannot be submitted by the proxy applicant appear or forms that can be submitted by the proxy applicant, but cannot be submitted by the application requester are hidden. In other words, priority is given to the setting by the requester over the privilege and limitation set for the proxy applicant.

When a form is opened in the application requester mode, the form opening program changes the user object from that of the proxy applicant to that of the application requester, thereby the proxy applicant is enabled to see such values in the input fields as the name, employee number, etc. of the requester. Because the user object is changed such way in this preferred embodiment of the present invention, there is no need to prepare two types of forms (normal forms and delegated application forms) when designing forms.

Figure 2:
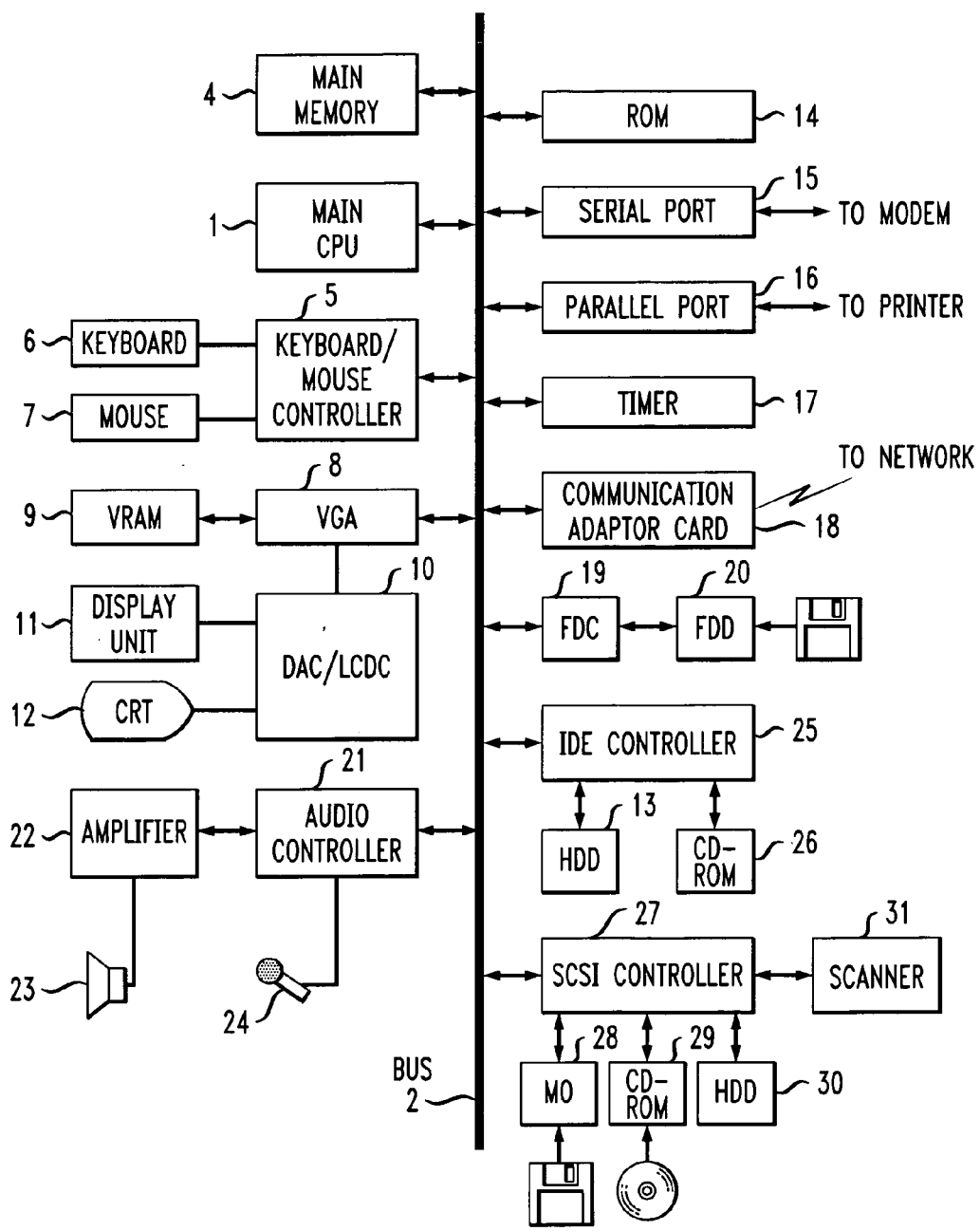
FIG. 2 is a block diagram of a hardware composition for materializing the electronic form system in the preferred embodiment of the present invention.

FIG. 2 is a block diagram of the hardware configuration for materializing an electronic form system 100 of the present invention. The electronic form system 100 includes a central processing unit (CPU) 1 and a memory 4. Both of the CPU 1 and the memory 4 are connected to hardware disk units 13 and 30 through a bus 2 and other paths. The hard disk units 13 and 30 are used as auxiliary storages. A floppy disk unit (or such medium driving units 26, 28, 29, 30 as an MO 28, CD-ROMs 26, or 29) 20 is connected to the bus 2 through a floppy disk controller (or one of various types of controllers, such as an IDE controller 25, or an SCSI controller 27) 19.

A floppy disk (or such a medium as an MO, or a CD-ROM) is loaded in the floppy disk unit (a medium driving unit 26, 28, 29, 30 such as an MO, or a CD-ROM) 20. And, in each of such storage media as this floppy disk unit, as well as a hard disk unit 13, or a ROM 14 are recorded computer program codes for instructing the CPU in cooperation with the operating system so as to materialize the present invention. The computer program codes are loaded into the memory 4 so as to be executed. Those computer program codes are compressed or divided into a plurality of groups so as to be recorded on a plurality of media.

The electronic form system 100 also includes a user interface hardware, which is, for example, a pointing device (a mouse, a joy stick, or a trackball) 7 for entering screen position data, a keyboard 6 for supporting key inputs, displays 11, 12 for presenting the user with image data. A speaker 23 is used to receive voice signals from an audio controller 21 through an amplifier 22 and output voices.

This electronic form system 100 can communicate with other computers through a serial port 15, a modem or such a communication adapter 18 as a token ring.

The present invention can be realized with use of an ordinary personal computer (PC), a work station, a computer built in such a home electric appliance as a TV set and a facsimile, a computer (car navigation system, etc.) installed e.g., in a car, or an aircraft or a combination of those computers. Those components are just examples, not necessarily indispensable for the present invention. Especially, because the present invention relates to processings of electronic forms, a parallel port 16, a serial port 15, an audio controller 21, an amplifier 22, and a speaker 23 illustrated in FIG. 2 are omissible from the embodiment of the present invention.

The electronic form system 100 can employ the following operating systems; those for supporting the GUI multi-window environment as standard, such as WindowsNT (a trademark of Microsoft), Windows9x (a trademark of Microsoft), Windows3.x (a trademark of Microsoft), OS/2 (a trademark of IBM), MacOS (a trademark of Apple Inc.), Linux (a trademark of Linus Torvlds), X-WINDOW system (a trademark of MIT) running on the AIX (a trademark of IBM); those for supporting a character-based environment, such as PC-DOS (a trademark of IBM), MS-DOS (a trademark of Microsoft); such a real-time OS as OS/Open (a trademark of IBM), VxWorks (a trademark of Wind River Systems, Inc.); operating systems built in network computers, such as JavaOS, etc. The electronic form system 100 does not limit the operating systems only to those for specific operating system environment.

Figure 3:
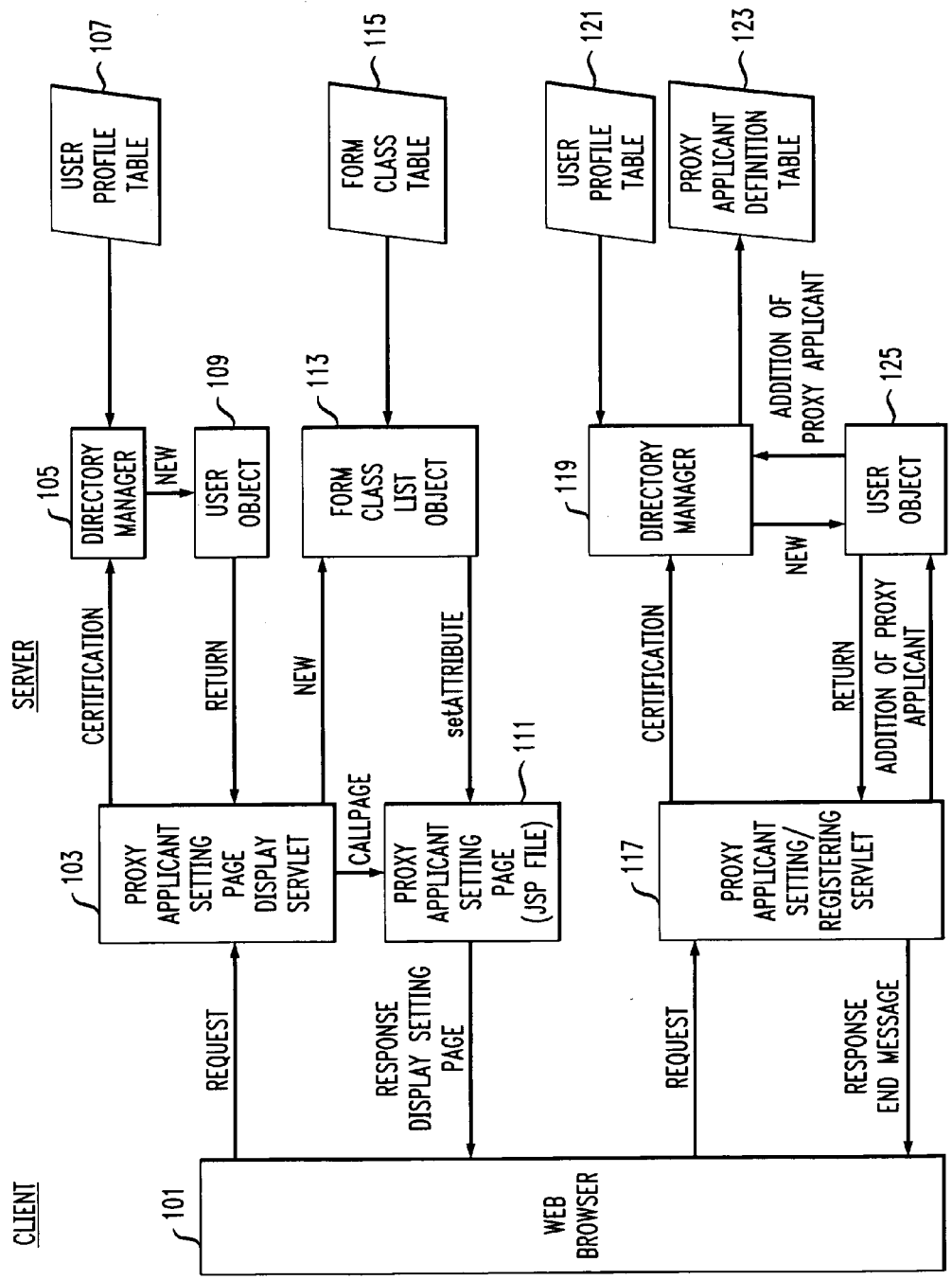
FIG. 3 is a block diagram of the components of the electronic form system in the preferred embodiment of the present invention.
Figure 7:
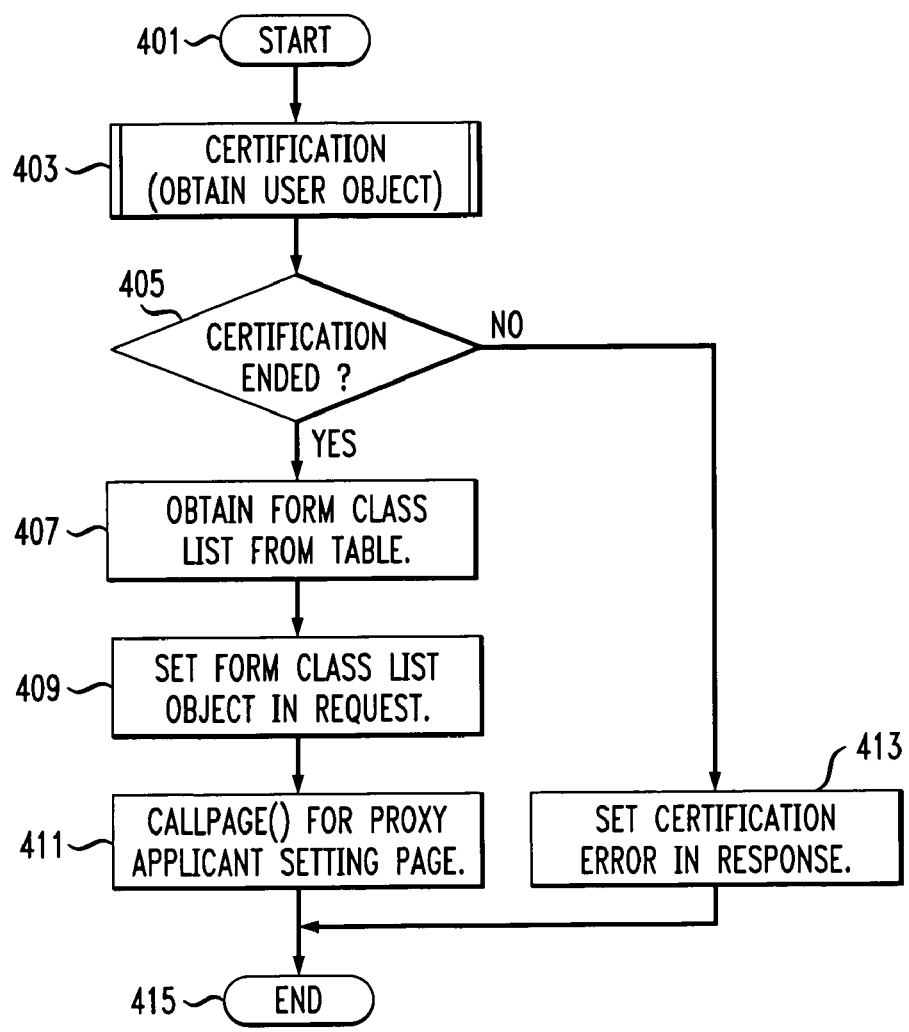
FIG. 7 is a flow chart of a procedure for displaying a proxy applicant setting page in the preferred embodiment of the present invention.

FIG. 3 is a functional block diagram for components of the electronic form system used for setting a proxy applicant in a preferred embodiment of the present invention. FIG. 7 is a flow chart of a procedure for displaying a proxy applicant setting page in a preferred embodiment of the present invention.

The procedure is started when an application requester 51 in a client site selects the proxy applicant setting menu in a web browser 101 (step 401). When this procedure is started, a proxy applicant setting page display servlet 103 is called. This servlet 103 is a component for requesting a directory manager 105 to be described later for certification of a user and obtaining necessary information to generate a proxy applicant setting page 111.

Figure 8:
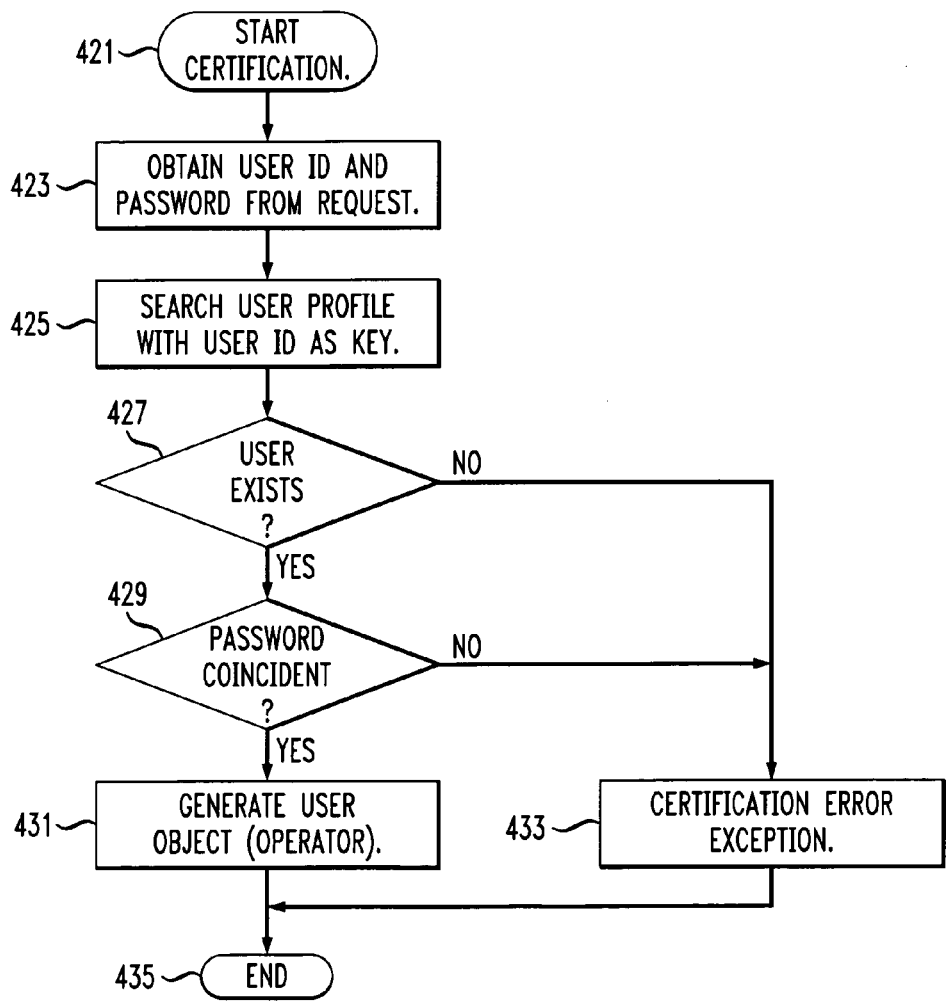
FIG. 8 is a flow chart of a certification processing procedure in the preferred embodiment of the present invention.

The servlet 103, when it is activated, requests the directory manager 105 for certification of a user (step 403). FIG. 8 is a flow chart of such a certification processing procedure in the preferred embodiment of the present invention. On starting the certification processing procedure (step 421), the directory manager 105 acquires the user ID and the password from the requester (step 423). The user ID and the password are used as a key for searching a user profile 107 (step 425).

FIG. 14 shows the information managed in the user profile 107 in a preferred embodiment of the present invention. A user profile table 210 in this preferred embodiment manages a user ID 211, a name 213, a comment 215, a password 217, a server ID 219, a table name 221, and a mail address 223.

If a user ID is detected and the password coincides with the registered one as a result of the search (steps 427 and 429), a user object is generated for the user ID (step 431). If the entered user ID is not detected or the password does not coincides with the registered one, it is regarded as a certification error, which is then processed (steps 433 and 413 in FIG. 7). The information of the user object 109 in this preferred embodiment is used to manage the information extracted from the user profile table 210, so that it manages almost the same information as the extracted one in this embodiment.

When the certification processing is finished, the proxy applicant setting page display servlet 103 calls a form class list acquisition object 113. The form class list acquisition object 113, when activated in response to the call, accesses a form class table 115 to obtain the form class list (step 407). FIG. 19 shows the information managed in the form class table 115 in this preferred embodiment. As shown in FIG. 19, the form class table 310 manages a form class ID 311, a form class name 313, and a comment 315.

The form class name defines data in categories of "personnel affairs," "accounting affairs," or "welfare affairs," in accordance with a form type. "Purchase general articles," "demand temporary payment," "apply for a resort house," and the like, which are expected to generate both form type and delegated application at the same time, may be managed for each category.

The form class list acquisition object 113 then returns the acquired form class list to the proxy applicant setting page display servlet 103 (step 409). The servlet 103 then calls the proxy applicant setting page 111 and displays the form class list on the screen of this web browser 101 (step 411).

FIG. 22 shows a perspective view of the proxy applicant setting page in this preferred embodiment. As shown in FIG. 22, the page 640 has a field 641 for entering information (proxy applicant user ID) that specifies a proxy applicant, radio buttons 643 to 647 for specifying a privilege range respectively, a check box 649 for specifying a form class, a pull-down menu 651, and input fields 653 and 655 for specifying a valid delegation term.

Figure 9:
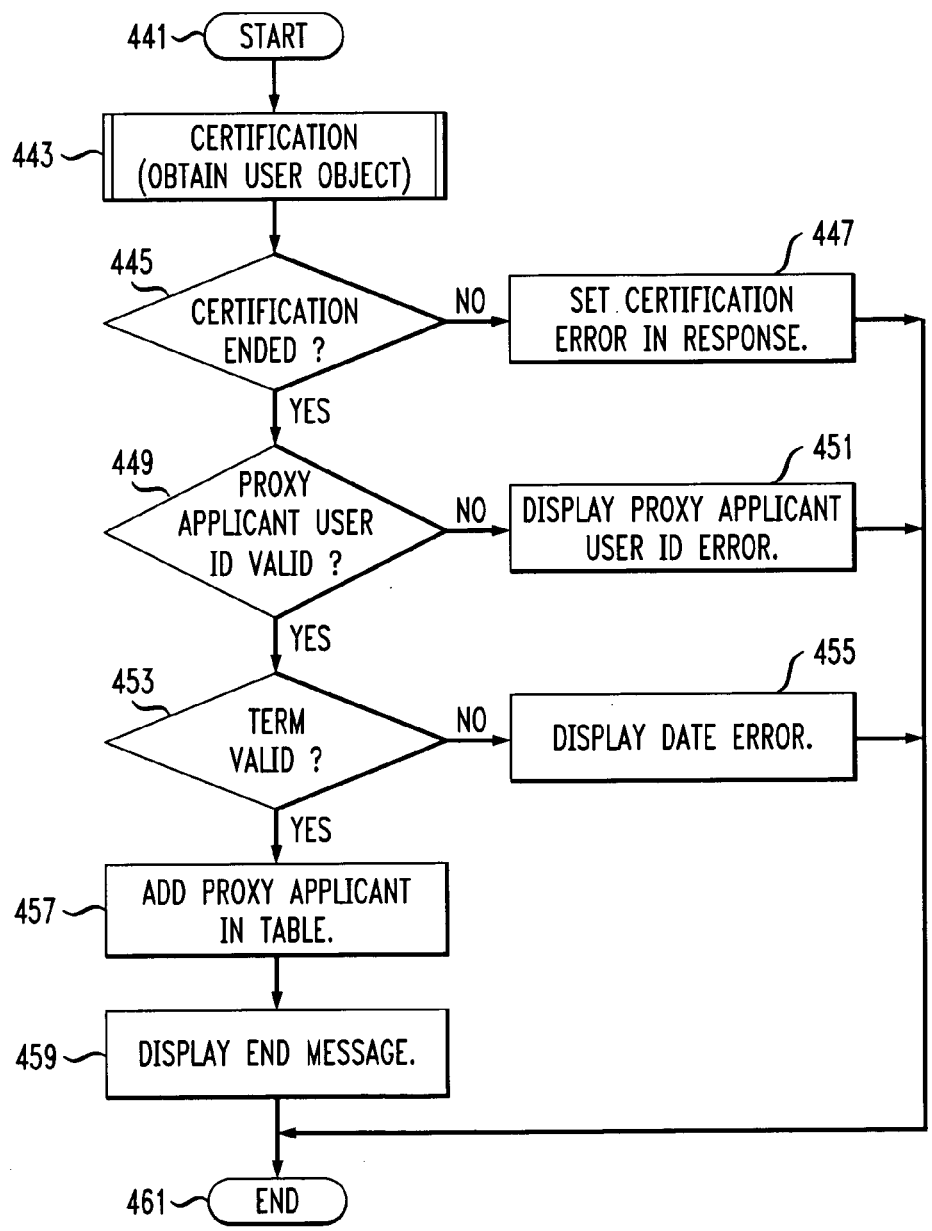
FIG. 9 is a flow chart of a procedure for registering a proxy applicant in the preferred embodiment of the present invention.

FIG. 9 is a flow chart of a procedure for registering a proxy applicant in a preferred embodiment of the present invention. This procedure is started when the application requester 51 fills the necessary items in the proxy applicant setting page, then presses the new setting button 657 (step 441).

When the procedure is started, the proxy applicant setting/registering servlet 117 is called first. This servlet 117 is a component for requesting the directory manager 105 to be described later to certify the user and register the user as a proxy applicant in the proxy applicant definition table, as well as checking the delegation term validity and outputting response messages.

The proxy applicant setting/registering servlet 117, when it is activated, requests the directory manager 105 to certify the user (step 443) and execute a predetermined error processing if a certification error is detected (steps 445 and 447). In addition, the servlet 117 checks the validity of the proxy applicant user ID (steps 449 and 451) and the delegation term validity (steps 453 and 455). If the proxy applicant information is judged to adapt with all the predetermined requirements, the servlet 117 registers the proxy applicant information in the proxy applicant definition table 123 according to the information specified on the proxy applicant setting page 640.

FIG. 15 shows the information managed in the proxy applicant definition table 123 in a preferred embodiment of the present invention. The proxy applicant definition table 230 manages a record ID 231, a requester ID 233, a proxy applicant ID 235, an application privilege 237, an approval privilege 239, a delegation starting date 241, a delegation ending date 243, and a form class ID 245, of each form. If addition of an item to this table is ended normally, the proxy applicant setting/registering servlet 117 transmits a response end message to the web browser 101 (step 459).

Figure 4:
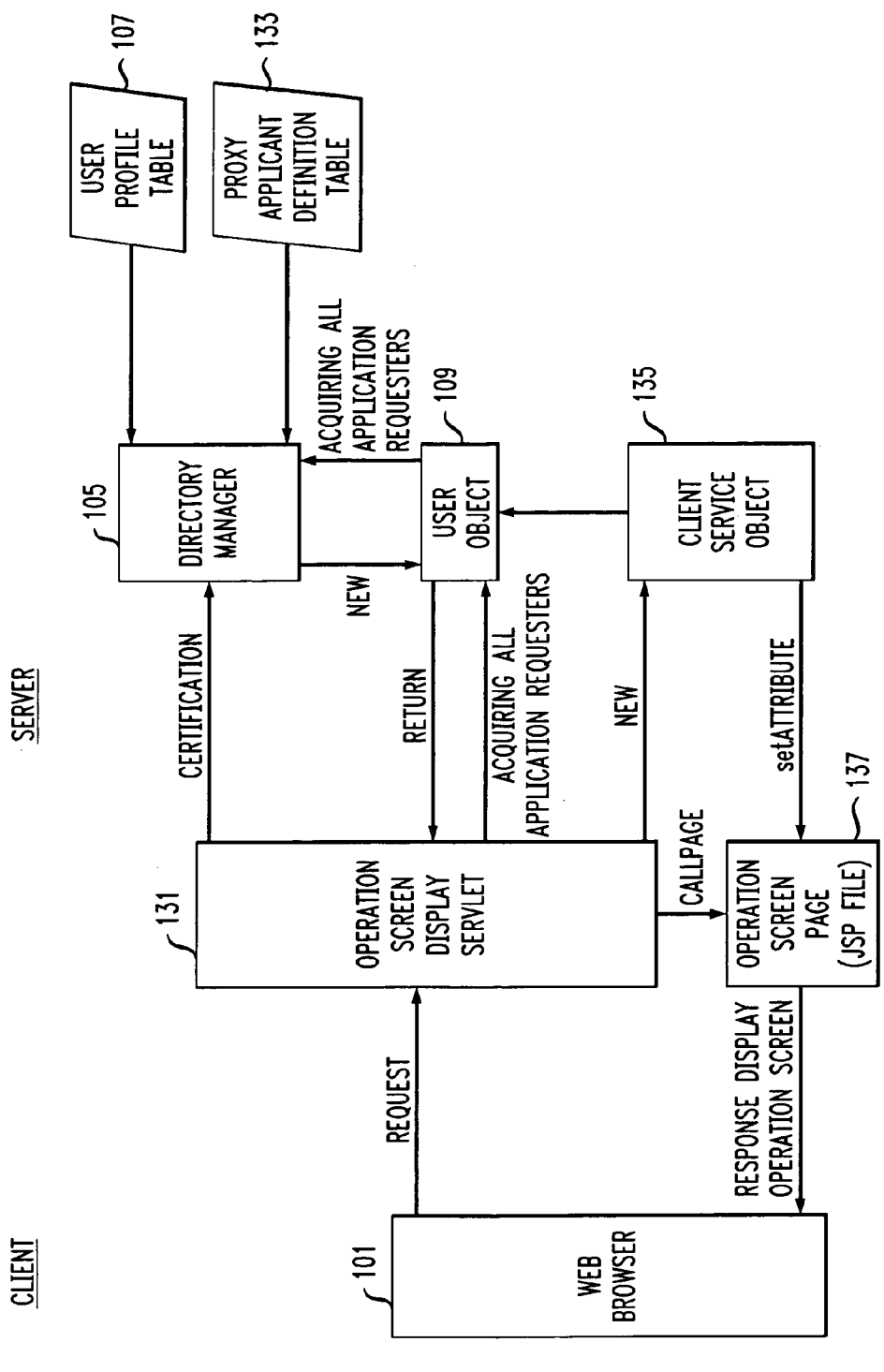
FIG. 4 is a block diagram of the components of the electronic form system in the preferred embodiment of the present invention.
Figure 10:
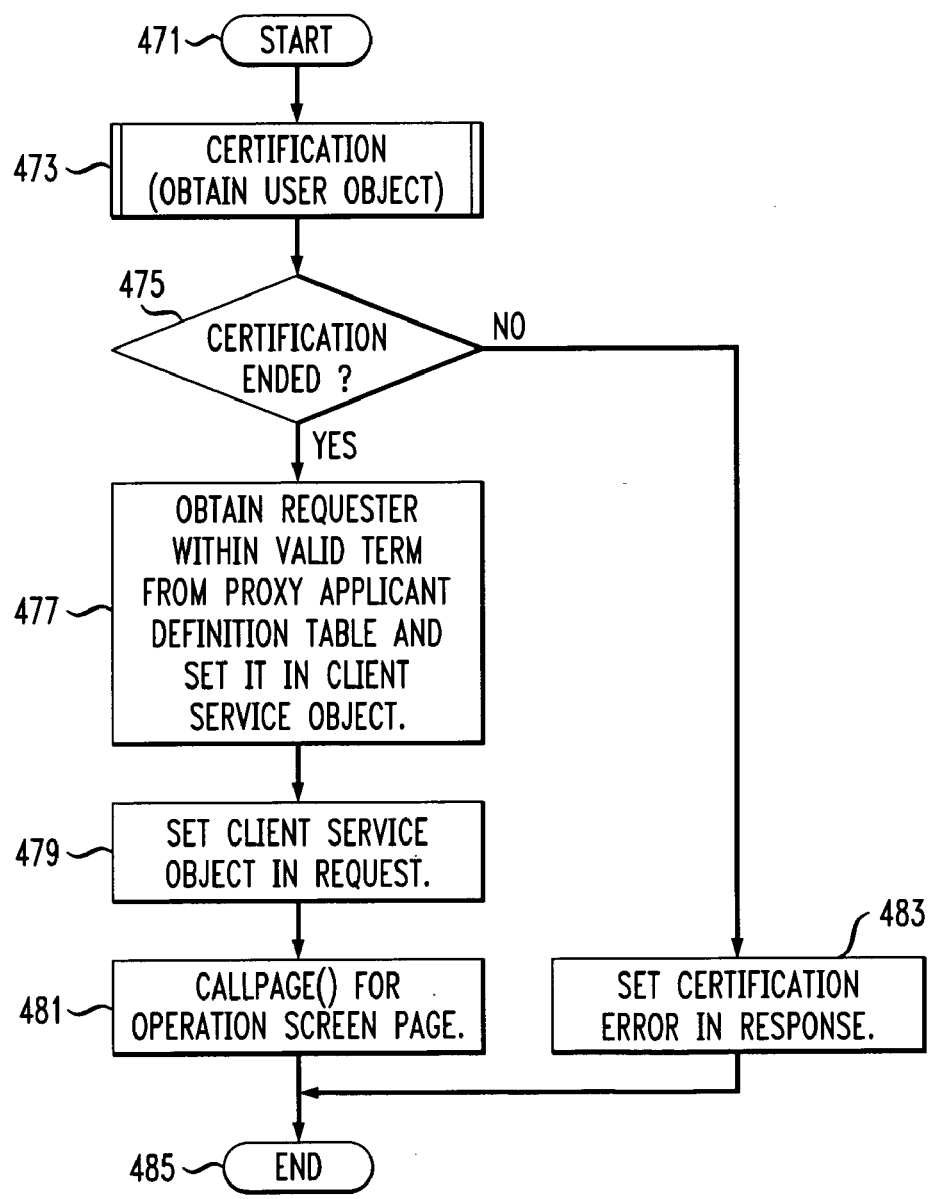
FIG. 10 is a flow chart of a procedure for displaying an operation screen page for a proxy applicant in the preferred embodiment of the present invention.

FIG. 4 is a functional block diagram for components of the electronic form system when a proxy applicant accesses the operation screen in a preferred embodiment of the present invention. FIG. 10 is a flow chart of a procedure for displaying an operation screen page for a proxy applicant in the preferred embodiment of the present invention.

This procedure is started (step 471) if the proxy applicant 63 accesses the operation screen of the web browser 101 in a client site. When this procedure is started, the operation screen display servlet 131 is called first. This servlet 131 is a component for requesting the directory manager 105 to certify the user and generating a client service object that acquires necessary information for displaying the operation screen page 137.

The operation screen display servlet 131, when it is started, requests the directory manager 105 to certify the user (step 473). If an error occurs in the certification processing, the servlet 131 processes the error (step 483). The servlet 131 searches the proxy applicant definition table 230 with the conditions that the user ID is defined in the field of proxy applicant 235 and the current date is within the delegation term data 241 to 243, and obtains the requester ID from the hit list. The servlet 131 also obtains the user name 213 having the user ID from the user profile table and sets the user name 213 together with the user ID in the generated client service object 135 (step 477). The information set in the client service object 135 is passed to the operation screen page 137 and then transmitted to the web browser 101 (steps 479 and 481).

Figure 23:
FIG. 23 illustrates the concept of an operation screen of the electronic form system in the preferred embodiment of the present invention.

The left side frame 621 in FIG. 23 indicates the concept of the operation screen page displayed on the web browser 101. This operation screen page includes a link to enter the application requester mode.

Figure 5:
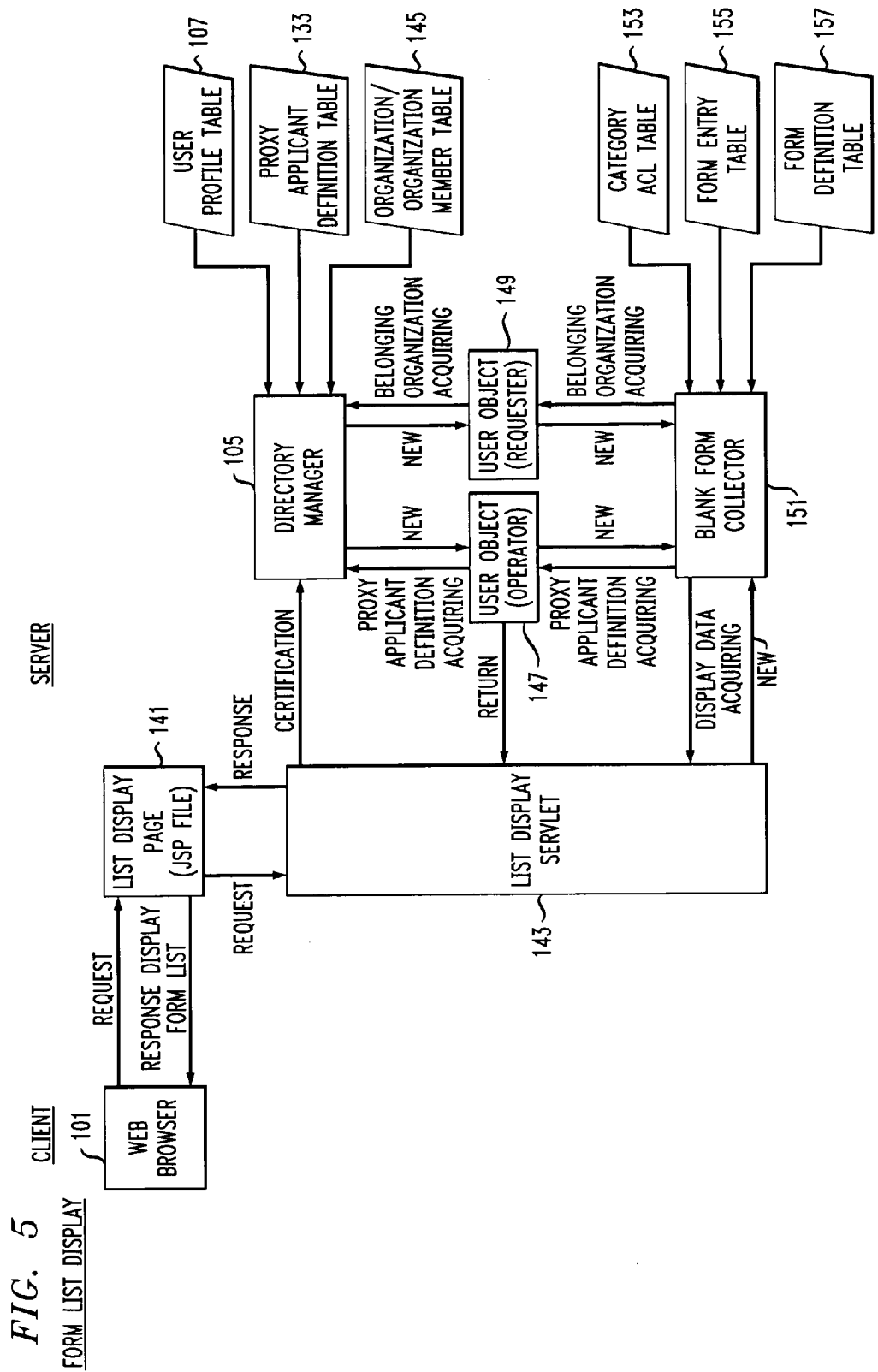
FIG. 5 is a block diagram of the components of the electronic form system in the preferred embodiment of the present invention.
Figure 11:
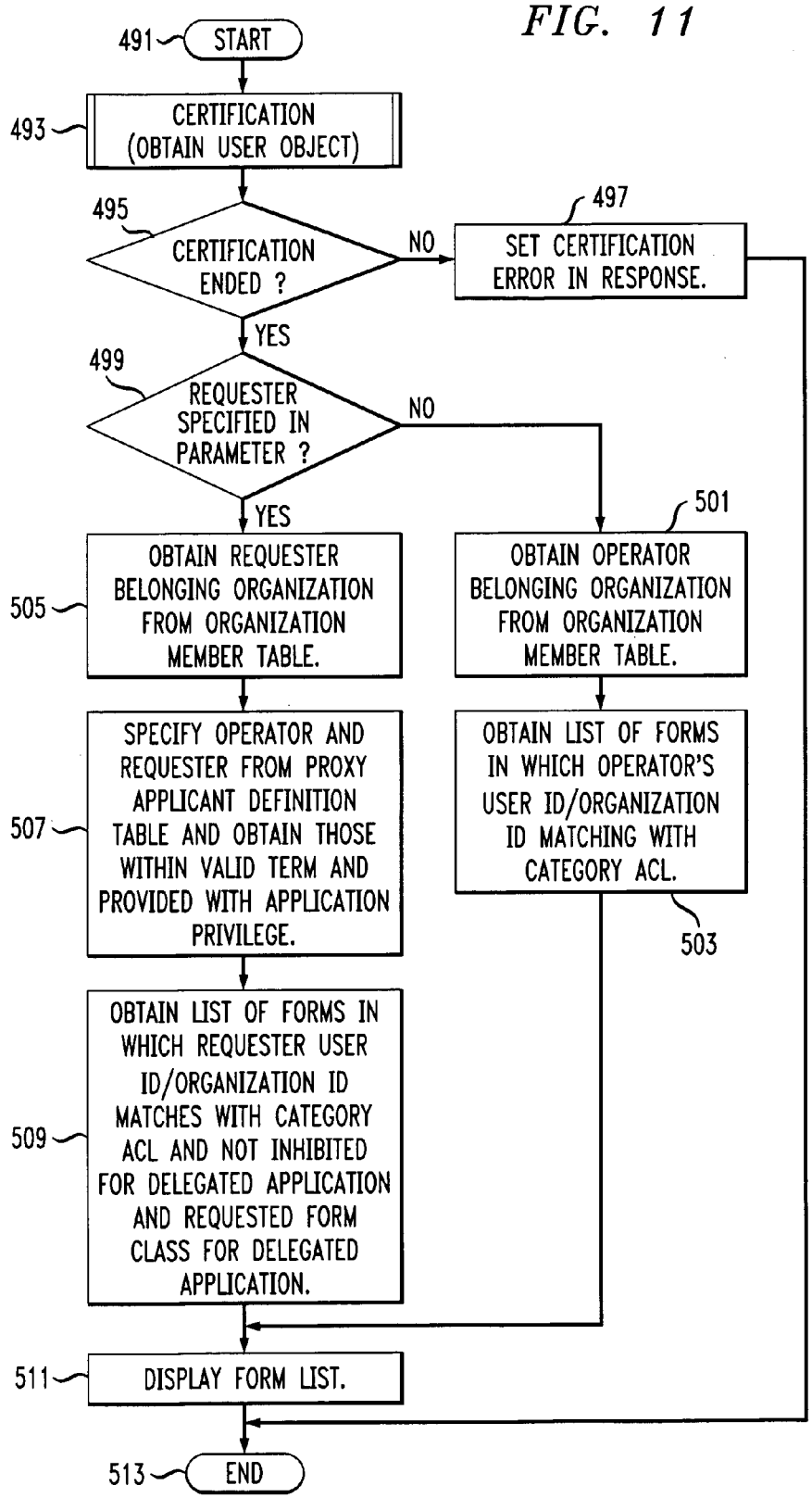
FIG. 11 is a flow chart of a procedure for obtaining a form list in the preferred embodiment of the present invention.

FIG. 5 is a functional block diagram of components of the electronic form system used by a proxy applicant to obtain a form list in a preferred embodiment of the present invention. FIG. 11 is a flow chart of a procedure for obtaining a form list in the preferred embodiment of the present invention.

Just like "C-2. ACCESSING THE PROXY APPLICANT OPERATION SCREEN," this procedure is started (step 491) when the proxy applicant 63 accesses the operation screen of the web browser 101 in a client site. When the procedure is started, the list display servlet 143 is called. This servlet 143 is a component for requesting the directory manager 105 to certify the user and for adding form names of accessible electronic forms, etc. to the list display page 141.

The list display servlet 143, when it is started, requests the directory manager 105 to certify the user (step 493). If an error is detected in the certification processing, the servlet 143 processes the error (step 497). On the other hand, if the certification processing is ended normally, the servlet 143 judges whether or not the application requester ID is set in the parameter passed to itself upon its starting (step 499).

In the preferred embodiment of the present invention, if a form list is called first, a blank or the user ID of the requester is set in the application requester parameter. The operator can thus obtain the form list according to the access privilege of the operator him/herself. On the other hand, to click the application requester name shown in FIG. 23, the user ID of the requester is passed to the list display servlet as a parameter.

If the requester ID is not set in any parameter, the servlet 143 regards the processing to be related to a processing for the operator's electronic form. Thus, the servlet 143 obtains the operator belonging organization data from the organization member table (step 501). FIG. 17 shows the concept of the organization member table 270 in a preferred embodiment of the present invention. The organization member table 270 manages the organization ID 271 and the user ID 273 of each member of the organization.

After this, the servlet 143 obtains a form list for which both user ID and organization ID of the operator match with the category ACL (Access Control List) table (step 503). Before describing this processing procedure in detail, each of the tables to be referenced in this processing will be described below. FIG. 18 shows the concept of the category ACL table in a preferred embodiment of the present invention. FIG. 16 shows the concept of the organization table in the preferred embodiment of the present invention.

The category ACL table 290 manages information of a category ID 291, a user ID/organization ID 293, a type 295, and an access privilege 297 of each form. The category ID 291 is information for defining the category of each accessible form. The user ID/organization ID 293 is information for specifying an accessible user or organization. The type 295 is information for indicating that the user ID/organization ID 293 indicates a user ID, both member and manager of an organization, or both members and managers of an organization and another organization under the organization in the hierarchical structure.

The organization table in a preferred embodiment of the present invention to be described later manages ID information of a direct upper organization of an organization, so it can specify an organization positioned under a specific organization ID. The access privilege 297 manages an access privilege such as enabling only reference, enabling updating, etc.

On the other hand, the organization table 250 in a preferred embodiment of the present invention manages information of the organization ID 251, which is an organization identifier, an organization name 253, a comment 255, the user ID 257 of a manager, and a directly belonging organization ID 259.

FIG. 20 shows the concept of a form entry table in a preferred embodiment of the present invention. FIG. 21 shows the concept of a form definition table 350 in the preferred embodiment of the present invention. In the preferred embodiment of the present invention, one electronic form is managed in a plurality of categories and sub-categories with use of a form entry table employed together with the form definition table. As shown in FIG. 20, the form entry table 330 manages information of a record ID 331, a server ID 333, a form ID 335, a category ID 337, a category name 339, and sub-category names 341 to 347 of each form.

The record ID 331 is information for specifying a record registered in the form entry table 330 uniquely. The server ID 333 is information for specifying a server that manages this record. The form ID 335 is information for specifying the form definition from a form entry. The category ID 337 is information for specifying a category to which this form entry belongs. The category name 339 is the name of a category to which this form entry belongs. Each of the sub-categories 341 to 347 defines the nesting state of a sub-category and the name of the sub-category.

On the other hand, the form definition table 350 in the preferred embodiment of the present invention manages the information of a record ID 351, a server ID 353, a form ID 355, a title 357, a comment 359, a form class ID 361, a delegated application flag 363, a delegation approval flag 365, a valid term starting date 367, a valid term ending date 369, a routing definition 371, a field definition 373, an event action definition 375, a start layout 377, and a start event list 379 of each form.

The record ID 351 is the information for specifying a record registered in the form definition table 350 uniquely. The server ID 353 is the information for specifying a server that manages the record. The form ID 355 is the information for identifying the electronic form uniquely. The title 357 is the title of the electronic form. The comment 359 is added information of the electronic form. The form class ID 361 is the information for specifying a form class to which this form belongs.

The delegated application flag 363 is a flag for controlling whether or not this electronic form enables a delegated application. If this flag is off, setting of a delegated application is always processed as an error. The delegation approval flag 365 is a flag for controlling whether to set the electronic form so as to approve a delegated application. If this flag is off, setting of approving for a delegated application is processed as an error.

The valid term starting date 367 defines the starting date of a valid term for a delegated application or a delegation approval. The valid term ending date 369 defines the ending date of a valid term for a delegated application or a delegation approval.

The routing definition 371 defines a route for processing the form. The definition is possible with use of a condition flag (indicating, for example, the manager of the applicant) and by a processing carried out by a specified user. The field definition 373 defines form input fields. The event action definition 375 controls events carried out when this form is called. The start layout 377 defines a path to a file that defines a blank form. The start event list 379 defines an event carried out when this form is called.

Return to FIG. 11 again to describe the processing in step 503. At first, the organization member table 270 is referenced with a key, which is the user ID of the operator, so that the organization ID 271 to which the user belongs is specified. Then, the organization ID 271 is used as a key for referencing the organization table 250. In this case, the reference is made for up to the top organization having the ID 259.

After this, the category ACL table is referenced, thereby judging whether or not the operator has a privilege for accessing categories sequentially to obtain a list of category IDs 291 for the privileged form. Then, each obtained category ID 291 is used as a key for accessing the form entry table 330 to obtain a list of form IDs 335. The title 357 of the form ID 335 is thus obtained from the form definition table 350.

On the other hand, if the user ID of the requester is set in the application requester parameter in step 499, the user ID of the requester is used as a key for referencing the organization member table 270, thereby obtaining the user belonging organization ID 271 (step 505). Then, the proxy applicant definition table 230 is accessed according to the user IDs of both operator and requester, thereby obtaining a privileged record within the valid term to specify a list of form class IDs 245 (step 507).

A list of forms is then obtained from the form definition table 350 (step 509). The list of forms must satisfy the conditions that the user ID/organization ID of the requester matches with the category ACL and it does not inhibit a delegated application, but corresponds to the delegated application requested form class ID.

The obtained form list is passed to the list display servlet 143 from the blank form collector 151. The servlet 143 then obtains the display items of the requester from the user object of the requester and sets them on the list display page 141. The right side frame shown in FIG. 23 indicates this list display page 141 displayed on the screen of the web browser 101.

Figure 6:
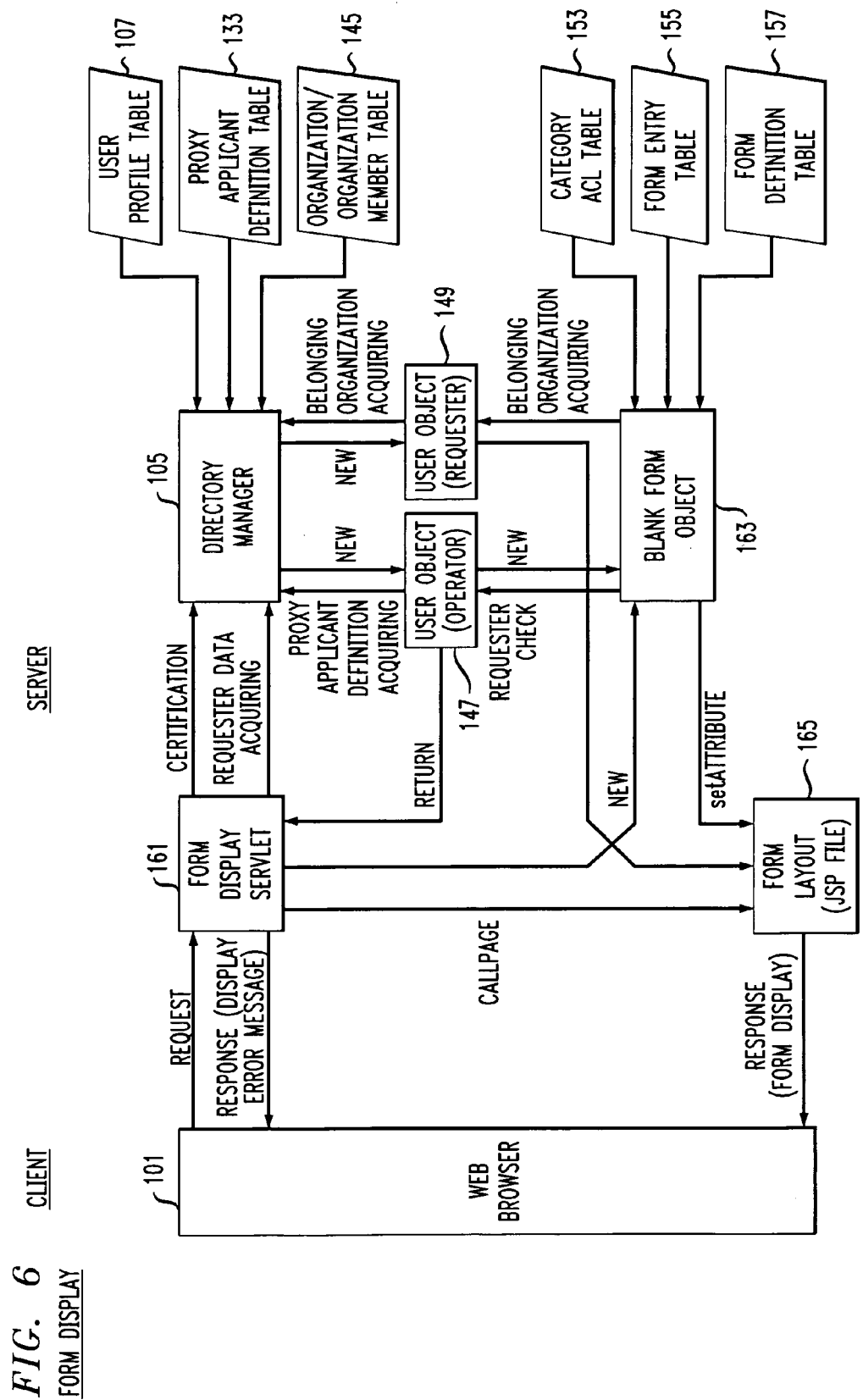
FIG. 6 is a block diagram of the components of the electronic form system in the preferred embodiment of the present invention.
Figure 12:
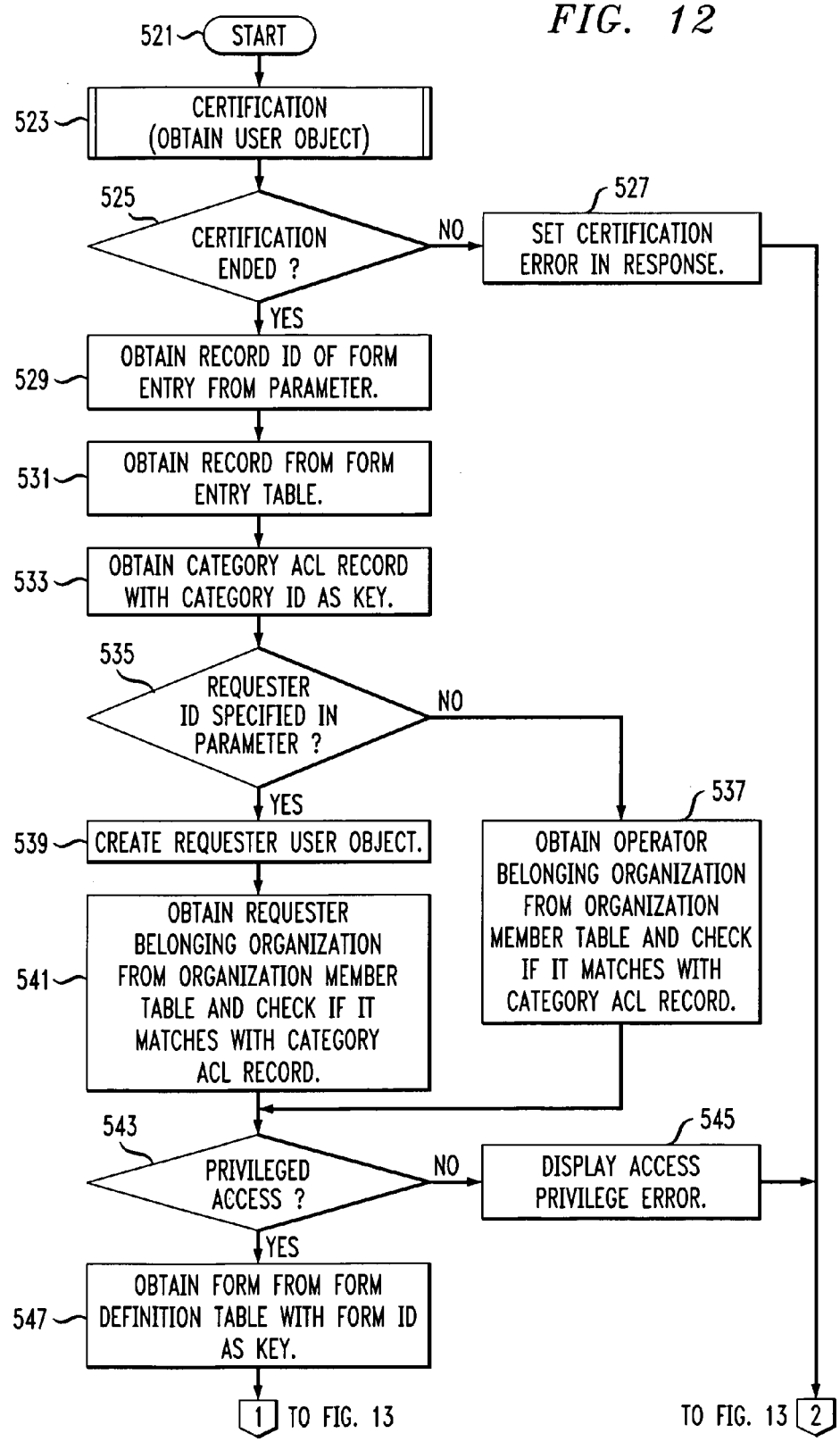
FIG. 12 is a flow chart of a procedure for obtaining an electronic form in the preferred embodiment of the present invention.
Figure 13:
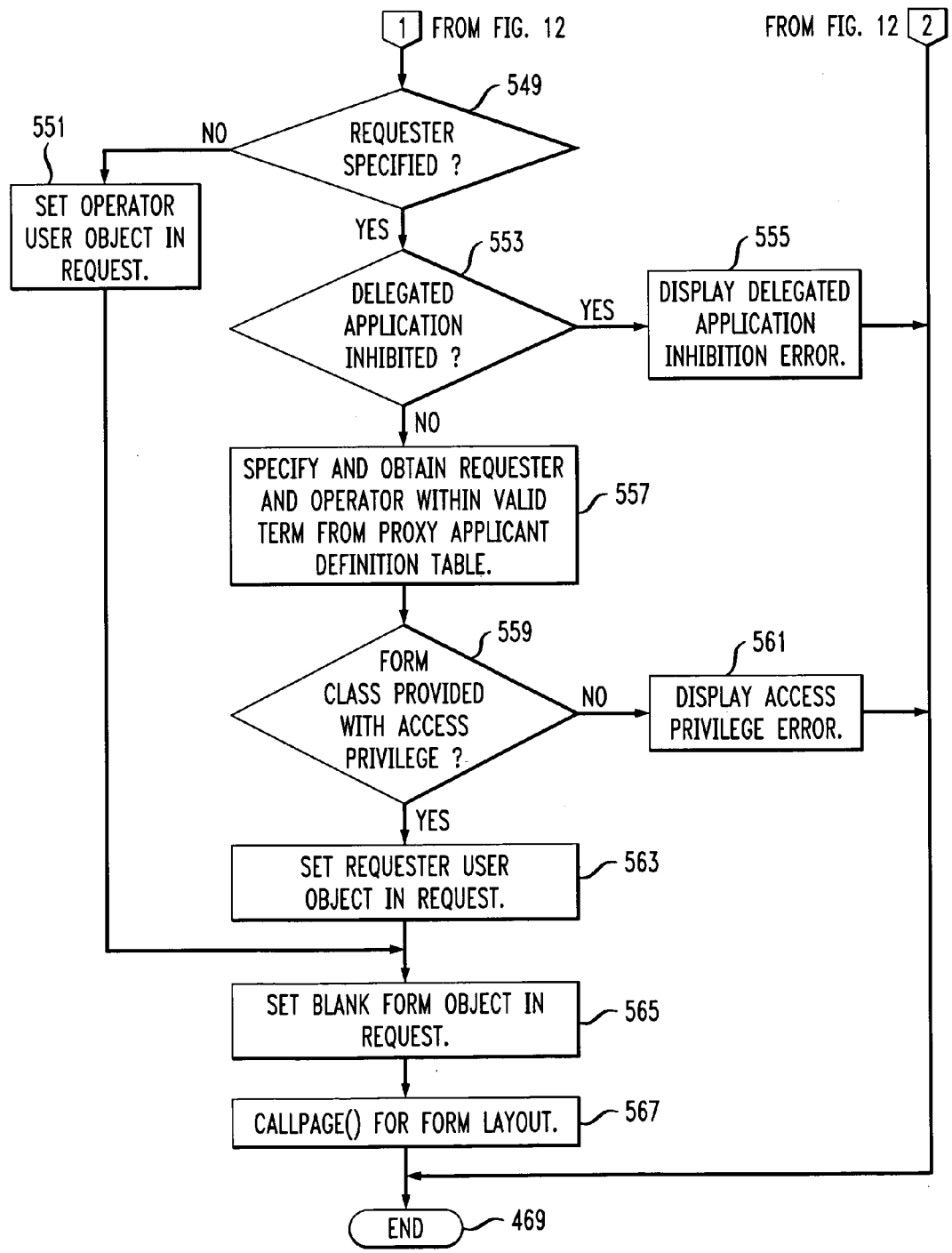
FIG. 13 is a flow chart of a procedure for obtaining an electronic form in the preferred embodiment of the present invention.

FIG. 6 is a functional block diagram of the components of the electronic form system operated for submitting an electronic form by selecting a desired electronic form from the form list in a preferred embodiment of the present invention. FIGS. 12 and 13 are flow charts of a procedure for obtaining a form through an operation in the preferred embodiment of the present invention.

This procedure is started (step 521) in response to the specification of a desired form selected from the form list shown in FIG. 23. When the procedure is started, the form display servlet 161 is activated. The servlet 161, when started, calls the directory manager 105 and certifies the operator (step 523). If an error is detected in the certification processing, the servlet processes the error (steps 525 and 527). On the other hand, if the certification processing is ended normally, the servlet 161 generates a blank form object 163 and passes a parameter to the blank form object. The parameter is a parameter passed to the form display servlet 161 when it is activated. The blank form object 163 acquires the form entry record ID from this parameter (step 529).

In the preferred embodiment of the present invention, the form entry record ID is related to the link of each form in the form list. The blank form object 163 accesses the form entry table 330 according to this record ID to obtain the record (step 531).

After this, the blank form object 163 accesses the category ACL table 290 according to the category ID 337 included in the record of the obtained form entry table 330, thereby obtaining the category ACL record (step 533).

The blank form object 163 then judges whether or not the application requester ID is set in any parameter passed from the form display servlet 161 (step 535). In the preferred embodiment of the present invention, if a form is submitted by the operator just like in the case of the form list shown in FIG. 11, then a blank or the user ID of the operator is set in a parameter. While the proxy applicant operates, the user ID of the application requester is passed to the form display servlet as a parameter.

If there is no parameter in which the ID of the application requester is set, the processing is regarded to be related to an electronic form of the operator. The operator belonging organization is thus obtained from the organization member table and judged for whether or not the organization ID coincides with the condition of the category ACL record obtained in step 533 (step 537).

If the application requester ID is set in the parameter, the processing is regarded to be related to an electronic form of the requester. Thus, a user object 149 of the requester is created (step 539), then the requester's organization is obtained from the organization member table and it is judged whether or not the organization coincides with the condition of the category ACL record obtained in step 533 (step 541).

If it is judged that the user ID and such an access privilege condition as the user belonging organization are not satisfied, the blank form object 163 returns an access privilege error to the form display servlet 161. The servlet 161 then displays the error message (steps 543 and 545).

If it is judged that the user ID and such an access privilege condition as the user belonging organization are satisfied, the blank form object 163 uses the form ID obtained from the form entry table 330 as a key to access the form definition table 350 from the form definition table 157 so as to obtain the record (step 547).

Figure 24:
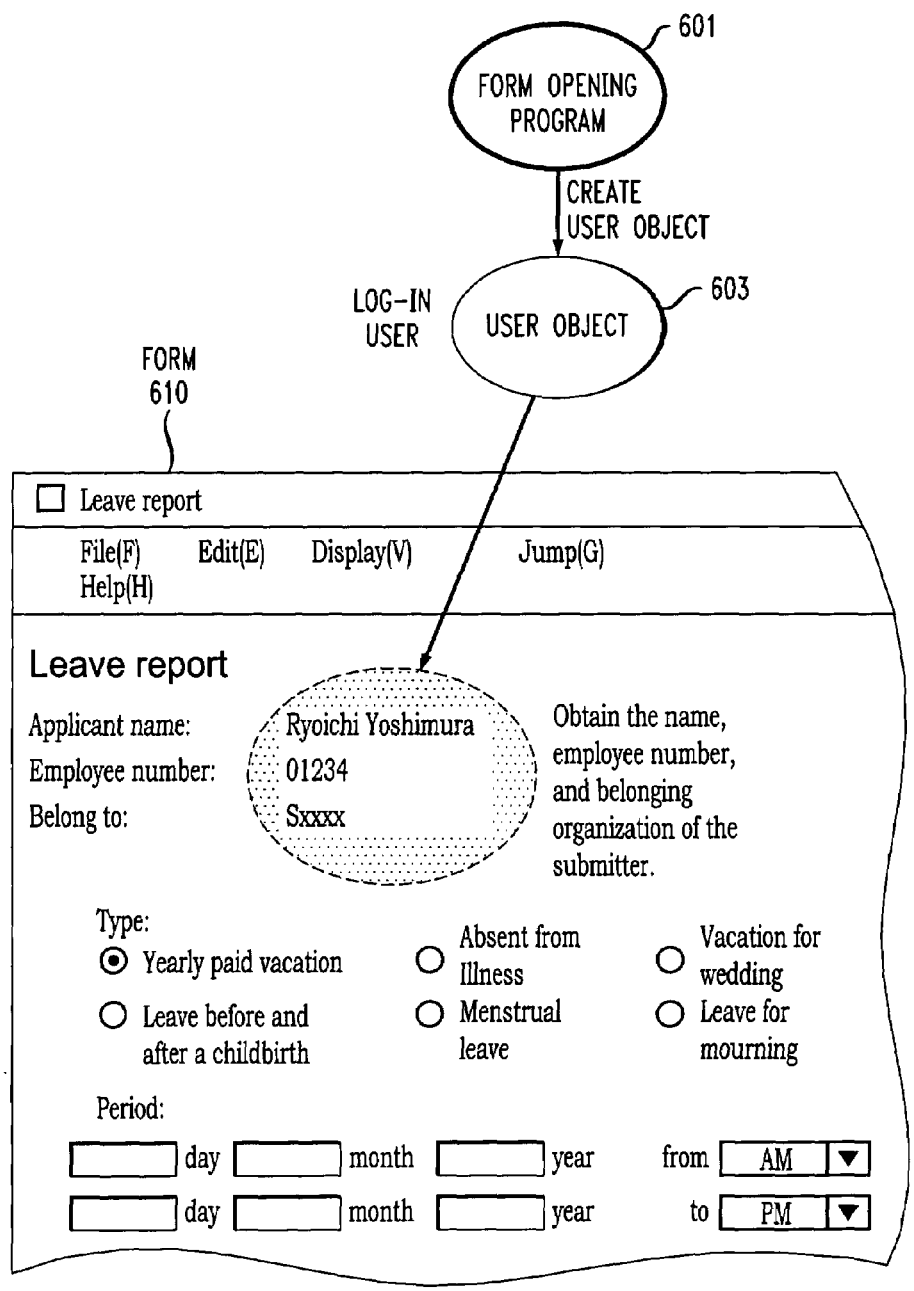
FIG. 24 illustrates the concept of an electronic form obtained in the preferred embodiment of the present invention.

If the blank form object does not receive the user ID of the application requester yet, (that is, if the operator him/herself submits a form)(step 549), then both user object information of the operator and form information are passed to the form layout 165 (steps 551, 565, and 567). The form is then displayed on the screen of the web browser 101 so as to be submitted, thereby a predetermined start event is carried out. After that, the operator can submit the form 610 as shown in FIG. 24.

If the blank form object receives the user ID of the requester (for a delegated application)(step 549), the delegated application flag 363 of the record in the form definition table 350 is checked, thereby judging whether or not the delegated application is inhibited for the form (step 553).

If the delegated application is inhibited, a predetermined error message is set in the response (step 555) so that the error message for the inhibited delegated application is displayed on the screen of the web browser 101.

If the delegated application is not inhibited, the proxy applicant definition table 230 is accessed according to keys, they are, the user IDs of both requester and proxy applicant, thereby obtaining the form class ID 245 of the application enabled record within the valid term (step 557). The obtained form class ID 245 is then compared with the form class 361 of the record in the obtained form definition table, thereby checking whether or not it is possible to access the form class (step 559).

If no access privilege is provided, a predetermined error message for notifying that no access privilege is set in the response (step 561), so that the error message is displayed on the screen of the web browser 101.

Figure 25:
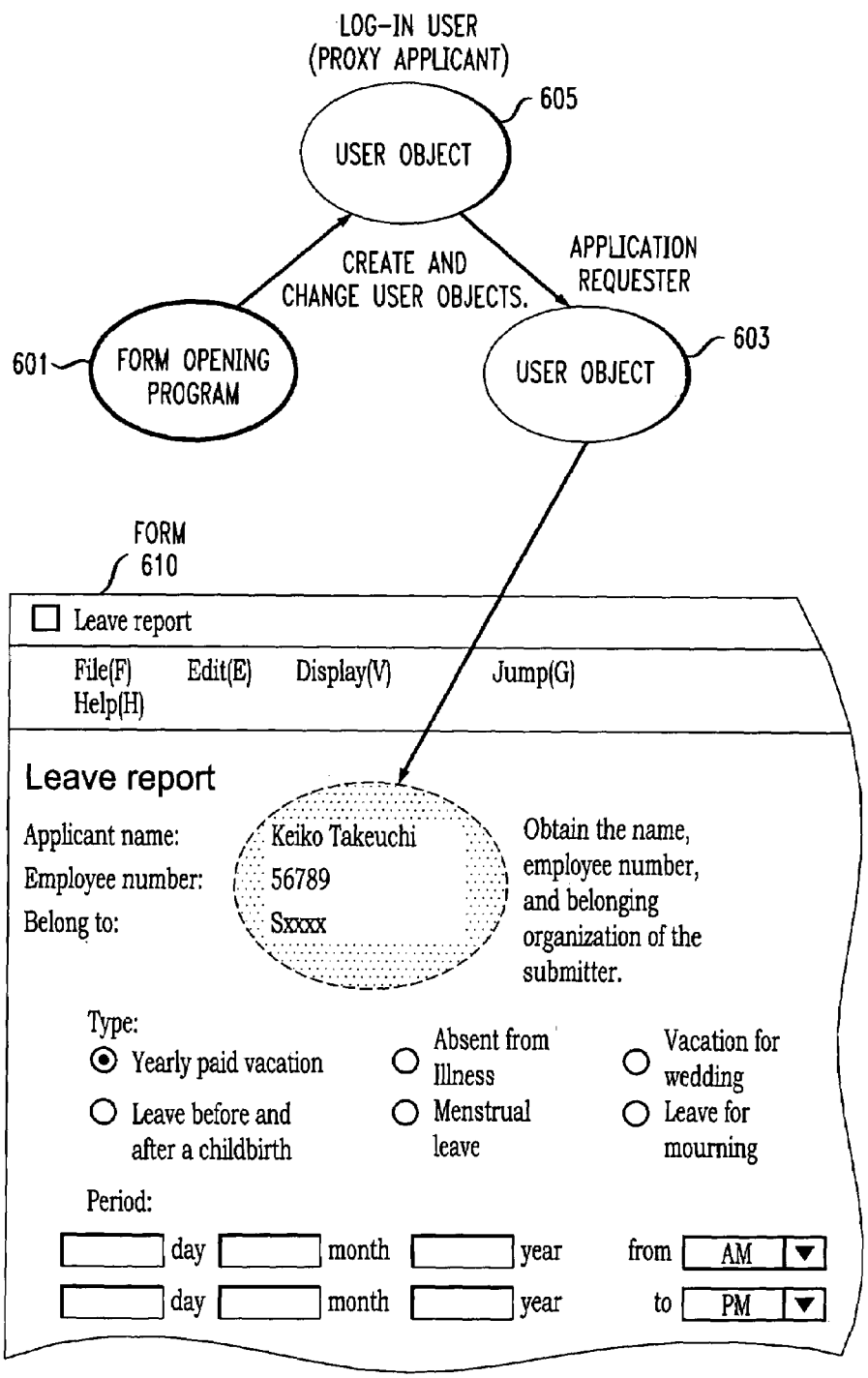
FIG. 25 illustrates the concept of an electronic form obtained in the preferred embodiment of the present invention.

If an access privilege is provided, both user object information of the requester and form information are passed to the form layout 165 (steps 563, 565, and 567), so that the form is displayed so as to be submitted on the screen of the web browser 101. A predetermined start event is thus carried out. After that, the proxy applicant can submit the form 610 instead of the application requester. In the example shown in FIG. 25, the proxy applicant submits an electronic leave report instead of the application requester, and the user object data (name, employee number, and organization) of the application requester is filled in the electronic leave report automatically.

In this case, the proxy applicant can request the application receiver for the processing of the electronic form in the next process with use of the information of the routing definition 371 contained in the form definition table 350 by filling predetermined items in the electronic leave report and pressing the processing request button. Concretely, this electronic form is stored in a database and a flow engine (not illustrated) references the data of the routing definition 371 contained in the form definition table 350, as well as the data contained in the organization table 250 and the organization member table 270, etc., thereby deciding the next worker (approver, etc.) and transmitting an electronic mail for requesting the processing to the worker. In the preferred embodiment of the present invention, this request electronic mail is provided with a program for accessing the electronic form stored in the database and carrying out the next process for the form (a URL, etc. for starting a servlet may be used here). The work-requested worker can recognize the receiving of the processing easily and carry out the processing.

The flow engine, also when requesting the processing in the next process, transmits an electronic mail to the application requester to notify that the processing is requested by the proxy applicant. In this case, this processing can be carried out just like the processing for transmitting an electronic mail for requesting the processing in the next process except that the mail is transmitted to the application requester and the mail does not include a program for referencing the electronic mail stored in the database.

As described above, according to the present invention, an application requester can provide a predetermined user with a privilege for a delegated application without providing the user with his/her log-in password.

It is to be understood that the embodiments and variations shown and described herein are merely illustrative of the principles of this invention and that various modifications may be implemented by those skilled in the art without departing from the scope and spirit of the invention.

What is claimed is:

1. An electronic form acquiring method employed for an electronic form system that certifies a user, said method comprising the steps of:
    (a) registering form condition data that identifies a form of requesting a delegated application and delegation term condition data that identifies a term of requesting said delegated application beforehand so as to be related to application requester specification data that specifies an application requester and proxy applicant specification data that specifies a proxy applicant who is requested for said delegated application respectively;
    (b) receiving an input for specifying said application requester specification data and accessing a first electronic form by said proxy applicant;
    (c) inspecting whether or not a current date adapts to said delegation term condition data registered so as to be related to said application requester specification data and said proxy applicant specification data;
    (d) inspecting whether or not said first electronic form coincides with said form condition data registered so as to be related to said application requester specification data and said proxy applicant specification data; and
    (e) enabling said first electronic form to be acquired if results of said inspections performed in (c) and (d) are acceptable.

2. An electronic form acquiring method employed for an electronic form system that certifies a user, said method comprising the steps of:
    (a) registering form condition data that identifies a form of requesting a delegated application beforehand so as to be related to application requester specification data that specifies an application requester and proxy applicant specification data that specifies a proxy applicant who is requested for said delegated application;
    (b) receiving an input for specifying said application requester specification data and accessing a first electronic form by said proxy applicant;
    (c) inspecting whether or not said first electronic form adapts to said form condition data registered so as to be related to said application requester specification data and said proxy applicant specification data; and
    (d) enabling said first electronic form to be acquired if a result of said inspection performed in (c) is acceptable.

3. An electronic form acquiring method in accordance with any of claims 1 and 2; wherein said method further includes a step of filling personal data of said application requester in said acquired first electronic form automatically.

4. An electronic form acquiring method in accordance with any of claims 1, 2, and 3; wherein said method further includes a step of displaying a list of available electronic forms.

5. An electronic form acquiring method in accordance with claim 4;
wherein said list of available electronic forms is decided according to an organization to which said application requester belongs.

6. An electronic form acquiring method in accordance with claim 4;
wherein each of said electronic forms managed by said electronic form system is related to a delegated application flag indicating whether or not said delegated application is enabled; and said electronic form is available when said delegated application flag indicates "enable."

7. An electronic form acquiring method in accordance with any of claims 1, 2, and 3 to 6; wherein an approver related to said electronic form receives a notice recognizable that said application has been submitted and said application requester receives a notice recognizable that said application has been submitted by said proxy applicant when predetermined items are filled in said acquired electronic form and an input for directing submission of said application is made.

8. An electronic form system having a processor and a memory, including:
(a) a directory manager that certifies a user;
(b) a proxy applicant definition table that manages form condition data that identifies a form of requesting a delegated application and delegation term condition data that identifies a term of requesting said delegated application so as to be related to application requester specification data that specifies an application requester and proxy applicant specification data that specifies a proxy applicant who is requested for said delegated application;
(c) a blank form collector, which acquires data that can specify said first electronic form when;
(c1) said blank collector is activated in response to an input for specifying said application requester specification data and accessing said first electronic form by said proxy applicant;
(c2) inspecting whether or not the current date coincides with said delegation term condition data registered so as to be related to said application requester specification data and said proxy applicant specification data;
(c3) inspecting whether or not said first electronic form coincides with said form condition data registered so as to be related to said application requester specification data and said proxy applicant specification data; and
(c4) results of said inspections of said delegation term condition data and said form condition data are acceptable.

9. An electronic form system, having a processor and a memory, which can certify a user, including:
(a) a directory manager that certifies a user;
(b) a proxy applicant definition table that manages form condition data that identifies a form of requesting a delegated application so as to be related to application requester specification data that specifies an application requester and proxy applicant specification data that specifies a proxy applicant who is requested for said delegated application;
(c) a blank form collector, which acquires data that can specify said first electronic form when;
(c1) said blank collector is activated in response to an input for specifying said application requester specification data and accessing said first electronic form by said proxy applicant;
(c2) inspecting whether or not said first electronic form adapts to said form condition data registered so as to be related to said application requester specification data and said proxy applicant specification data; and
(c3) a result of said inspection of said delegation term condition data is acceptable.

10. A storage medium for storing a program that acquires an electronic form, said program being executed in an electronic form system for certifying a user and containing:
(a) a program code for accessing a memory in which form condition data that identifies a form of requesting a delegated application and delegation term condition data that identifies a term of requesting said delegated application are registered so as to be related to application requester specification data that specifies an application requester and proxy applicant specification data that specifies a proxy applicant who is requested for said delegated application;
(b) a program code for recognizing that an input for specifying said application requester specification data and accessing said first electronic form, is received by said proxy applicant;
(c) a program code for inspecting whether or not the current time coincides with said delegation term condition data registered so as to be related to said application requester specification data and said proxy applicant specification data;
(d) a program code for inspecting whether or not said first electronic form adapts to said form condition data registered so as to be related to said application requester specification data and said proxy applicant specification data; and
(e) a program code for enabling said first electronic form to be acquired if results of said inspections performed for said delegation term condition data and said form condition data are acceptable.

11. A storage medium for storing a program that acquires an electronic form, said program being executed in an electronic form system for certifying a user and containing:
(a) a program code for accessing a memory in which form condition data that identifies a form of requesting a delegated application is registered so as to be related to application requester specification data that specifies an application requester and proxy applicant specification data that specifies a proxy applicant who is requested for said delegated application;
(b) a program code for recognizing that an input for specifying said application requester specification data and accessing said first electronic form, is received by said proxy applicant;
(c) a program code for inspecting whether or not said first electronic form adapts to said form condition data registered so as to be related to said application requester specification data and said proxy applicant specification data; and
(d) a program code for enabling said first electronic form to be acquired if a result of said inspection performed for said form condition data is acceptable.

12. A storage medium in accordance with any of claims 10 and 11, wherein said medium further includes a program code for filling personal data of said application requester in said acquired first electronic form automatically.

13. A storage medium in accordance with any of claims 10 and 11, wherein said medium further includes a program code for displaying a list of available electronic forms.

14. A storage medium in accordance with claim 13, wherein said list of available electronic forms is decided according to an organization to which said application requester belongs.

15. A storage medium in accordance with claim 13; wherein an electronic form managed by said electronic form system is related to a delegated application flag indicating whether or not said delegated application is enabled; and an electronic form is available when said delegated application flag indicates "enable."

16. A storage medium in accordance with any of claims 10, 11, and 12 to 15; wherein said medium for storing program further contains; a program code for transmitting a notice to an approver related to said electronic form, said notice being recognizable that said electronic form has been submitted in response to an input for directing said application after predetermined items are filled in said acquired electronic form; and a program code for transmitting a notice to said application requester, said notice being recognizable that said application has been made by said proxy applicant.

17. An electronic form acquiring method employed for an electronic form system, said method comprising the steps of:
  registering form condition data that identifies a form for a delegated application and delegation term condition data that identifies a term for said delegated application, wherein said form condition data and delegation term condition data are related to application requester specification data and proxy applicant specification data, wherein said application requester specification data specifies an application requester and wherein said proxy applicant specification data specifies a proxy applicant who is requested for said delegated application; and
  enabling a first electronic form to be acquired.

18. An electronic form acquiring method in accordance with claim 17, wherein said method further includes a step of filling personal data of said application requester in said acquired first electronic form automatically.

19. An electronic form acquiring method in accordance with claim 17, wherein said method further includes a step of displaying a list of available electronic forms.

20. An electronic form acquiring method in accordance with claim 19, wherein said list of available electronic forms is decided according to an organization to which said application requester belongs.

21. An electronic form acquiring method in accordance with claim 19, wherein each of said electronic forms managed by said electronic form system is related to a delegated application flag indicating whether or not said delegated application is enabled; and said electronic form is available when said delegated application flag indicates "enable."

22. An electronic form acquiring method in accordance with any of claims 17 to 21, wherein an approver related to said electronic form receives a notice indicating that said application has been submitted and said application requester receives a notice that said application has been submitted by said proxy applicant when predetermined items are filled in said acquired electronic form and an input for directing submission of said application is made.

\* \* \* \* \*